(12) United States Patent
Nedivi

(10) Patent No.: US 11,854,430 B2
(45) Date of Patent: Dec. 26, 2023

(54) LEARNING PLATFORM WITH LIVE BROADCAST EVENTS

(71) Applicant: SHARELOOK PTE. LTD., Singapore (SG)

(72) Inventor: Raanan Nedivi, Singapore (SG)

(73) Assignee: SHARELOOK PTE. LTD., Singapore (SG)

( * ) Notice: Subject to any disclaimer, the term of this patent is extended or adjusted under 35 U.S.C. 154(b) by 0 days.

(21) Appl. No.: 17/229,815

(22) Filed: Apr. 13, 2021

(65) Prior Publication Data

US 2021/0233423 A1  Jul. 29, 2021

Related U.S. Application Data

(63) Continuation-in-part of application No. 16/773,992, filed on Jan. 28, 2020, now Pat. No. 11,069,250, which is a continuation-in-part of application No. 16/699,761, filed on Dec. 2, 2019, which is a continuation of application No. 16/015,203, filed on
(Continued)

(51) Int. Cl.
| | |
|---|---|
| *G09B 5/02* | (2006.01) |
| *H04L 65/403* | (2022.01) |
| *G09B 5/06* | (2006.01) |
| *H04W 4/08* | (2009.01) |
| *H04L 51/046* | (2022.01) |
| *H04L 67/50* | (2022.01) |
| *G06F 3/0482* | (2013.01) |
| *H04L 67/1095* | (2022.01) |
| *H04W 4/21* | (2018.01) |

(52) U.S. Cl.
CPC ............ *G09B 5/02* (2013.01); *G09B 5/06* (2013.01); *H04L 51/046* (2013.01); *H04L 65/403* (2013.01); *H04L 67/535* (2022.05); *H04W 4/08* (2013.01); *G06F 3/0482* (2013.01); *H04L 67/1095* (2013.01); *H04W 4/21* (2018.02)

(58) Field of Classification Search
CPC .......... G09B 5/02; G09B 5/06; H04L 67/535; H04L 51/046; H04L 65/403; H04W 4/08
See application file for complete search history.

(56) References Cited

U.S. PATENT DOCUMENTS

| | | | | |
|---|---|---|---|---|
| 6,315,572 B1 * | 11/2001 | Owens | ...................... | G09B 7/04 434/323 |
| 8,423,555 B2 * | 4/2013 | Ambwani | ......... | G06F 16/90344 707/913 |

(Continued)

*Primary Examiner* — William L Bashore
*Assistant Examiner* — Gregory A DiStefano
(74) *Attorney, Agent, or Firm* — Nyman IP LLC; Scott Nyman

(57) ABSTRACT

A method and system including an adaptive learning platform having a backend system and a frontend system. The backend system is configured to manage lessons for display on a user device. The backend system includes a creation module for creating new courses, the course module is configured to employ AI processing techniques to search for relevant content stored in a database of the backend component and recommend the relevant content to a user as course content (new course content) for a new course. The frontend system is configured to execute on the user device and includes a user interface for the user to access various modules of the backend system.

17 Claims, 34 Drawing Sheets

Related U.S. Application Data

Jun. 22, 2018, now Pat. No. 10,497,272, which is a continuation-in-part of application No. 15/821,828, filed on Nov. 23, 2017, now abandoned.

(60) Provisional application No. 63/108,858, filed on Nov. 2, 2020, provisional application No. 63/010,013, filed on Apr. 14, 2020, provisional application No. 62/798,452, filed on Jan. 29, 2019, provisional application No. 62/425,625, filed on Nov. 23, 2016.

(56) References Cited

U.S. PATENT DOCUMENTS

| | | | |
|---|---|---|---|
| 2006/0048092 A1* | 3/2006 | Kirkley, Jr. | A63F 13/63 717/100 |
| 2012/0077175 A1* | 3/2012 | Levisay | G09B 5/06 715/721 |
| 2014/0120516 A1* | 5/2014 | Chiang | G09B 5/02 434/362 |
| 2014/0162224 A1* | 6/2014 | Wallace | G09B 5/06 434/219 |
| 2014/0377732 A1* | 12/2014 | Freedman | G09B 5/02 434/365 |
| 2015/0046822 A1* | 2/2015 | Kitch | G06F 3/0482 715/721 |

\* cited by examiner

|  | Start | End | Duration |
|---|---|---|---|
| Video0 | 0:00:00 | 0:03:09 | 0:03:09 |
| Video1 | 0:03:09 | 0:07:23 | 0:04:14 |
| Video2 | 0:07:23 | 0:11:19 | 0:03:56 |
| Video3 | 0:11:19 | 0:15:31 | 0:04:12 |
| Video4 | 0:15:31 | 0:19:37 | 0:04:06 |
| Video5 | 0:19:37 | 0:23:28 | 0:03:51 |
| Video6 | 0:23:28 | 0:28:20 | 0:04:52 |
| Video7 | 0:28:20 | 0:32:51 | 0:04:31 |
| Video8 | 0:32:51 | 0:36:42 | 0:03:51 |
| Video9 | 0:36:42 | 0:41:14 | 0:04:32 |

Fig. 3c

Host creates live event for a specific participant
IOS version

Host creates live event
PC version

LEARNING PLATFORM WITH LIVE BROADCAST EVENTS

CROSS-REFERENCE TO RELATED APPLICATION

This application claims the benefit of U.S. Provisional Application Ser. No. 63/010,013, filed on Apr. 14, 2020, and also claims the benefit of U.S. Provisional Application Ser. No. 63/108,858, filed on Nov. 2, 2020. This application is also a continuation-in-part of co-pending application U.S. patent application Ser. No. 16/773,992, filed on Jan. 28, 2020, which claims the benefit of U.S. Provisional Application Ser. No. 62/798,452, filed on Jan. 29, 2019, and is a continuation-in-part of co-pending U.S. patent application Ser. No. 16/699,761, filed on Dec. 2, 2019, which is a continuation of co-pending application U.S. patent application Ser. No. 16/015,203, now U.S. Pat. No. 10,497,272, filed on Jun. 22, 2018, which is a continuation-in-part application of co-pending U.S. patent application Ser. No. 15/821,828, abandoned on Jun. 27, 2019, filed on Nov. 23, 2017, which claims the benefit of U.S. Provisional Application Ser. No. 62/425,625, filed on Nov. 23, 2016. All disclosures are herein incorporated by reference in their entireties for all purposes.

FIELD OF THE INVENTION

The present invention is generally related to a networked platform for interactive learning. More specifically, the present invention is directed to an interactive virtual learning platform configured to rapidly create digital content in an intelligent and learning effective manner.

BACKGROUND

The world is waking up to a global problem facing enterprises as intelligent machines make traditional jobs obsolete and economic upheavals due to healthcare lockdowns have put many workers out of jobs. The challenge for industrialized economies is to upskill and cross-skill their workforce rapidly and effectively to take on new job roles in the dynamically changing economic landscape. Online course creation remains a huge barrier in terms of cost and pedagogical expertise required. It is heavily labour- and expertise-intensive.

While the training institutions and enterprises have attempted to adopt meeting tools such as Zoom and Google Meet to replicate classroom learning settings and resources, these tools are not designed for structured online learning curriculum stretched over a series of lessons. The blending of the asynchronous resources (e.g. reading materials and videos) with the synchronous 'live' teaching is not available on these platforms. As result, in an attempt to merge these meeting tools with resources, learners are required to visit numerous sites (e.g. Google docs, Zoom, YouTube) in order to complete their learning journey. This creates confusion and disruptions to their learning experience. Overall, there are a number of challenges that enterprises and training institutions face when building up digital learning resources.

The first challenge is also a longstanding issue concerning the lack of pedagogical skills and time that Subject Matter Experts and Learning & Development (L&D) practitioners have to take to design, implement and deliver effective online learning content. The amount of time required to design and create the courses is a high barrier to entry for these experts and L&D practitioners. The second challenge has to do with a lack of a platform that integrates synchronous and asynchronous content and delivery approaches to make a seamless learning experience. The third challenge is the lack of quality localized online content with many training providers resorting to purchasing ready-made content from overseas.

Accordingly, there is a need for a computer implemented method and system configured to rapidly create digital content in an intelligent and learning effective manner.

SUMMARY

The present disclosure describes exemplary systems and methods to facilitate remote learning, remote teaching and remote evaluation. The disclosed example systems and methods may be more effective than conventional remote learning and teaching methods.

In one embodiment, a method for forming an adaptive learning platform includes providing a backend system, the backend system is configured to execute on a server and manage lessons for display on a user device, wherein the backend system includes a creation module for creating new courses, the course module is configured to employ AI processing techniques to search for relevant content stored in a database of the backend component and recommend the relevant content to a user as course content (new course content) for a new course. The method also includes providing a frontend system, the frontend system is configured to execute on the user device, wherein the frontend system includes a user interface for the user to access various modules of the backend system.

These and other advantages and features of the systems and methods herein disclosed, will become apparent through reference to the following description and the accompanying drawings. Furthermore, it is to be understood that the features of the various implementations described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of various implementations. In the following description, various implementations of the present disclosure are described with reference to the following, in which:

FIG. 3c shows an exemplary table of timestamps of start and end timings determined for each video segment of a video processed for video splitting;

DETAILED DESCRIPTION

A framework for an interactive learning system and method is described herein. In particular, the present disclosure relates to a learning system and method configured to rapidly create digital content in an intelligent and learning effective manner through a digital learning platform.

In some implementations, the digital learning platform allows course builders or trainers to rapidly generate courses by inputting essential learning content from existing sources such as video lectures, PowerPoint slides and Word documents. Course builders can also tap on innovative instructional frameworks to train competencies and expertise and adopt localised features (i.e. local voices for text to speech technology and the use of Speech Corpus) to contextualize the courses for training.

In some implementations, the digital learning platform is configured with unique functionalities to provide a framework that can create an effective learning environment. Such functionalities include: broadcasting functions integrated with resource repository to create a curriculum structure that guides learners through the course; Artificial Intelligence modules including a Natural Language Processing unit to drive text interpretation, splicing of learning video segments in an automated and streamlined process; rapid lesson templating functions to facilitate course creation; other features such as local voice features to localize the text to speech voice-over function; and all of which are configured to expedite a new course creation process.

The platform allows training institutions and enterprises to build and strengthen their internal Learning and Development capabilities, through AI support and rapid course creation tools. For example, the platform speeds up the design, development and implementation process for courses by providing ID templates, rich library of quality content and intuitive text-to-speech tools. As a result, the platform not only provides a rich media, multi-platform training solution that is cost-effective for institutions and enterprises, but also enriches the learning experience for learners with the use of local AI corpus and voices with local accents In some implementations, the digital learning platform employs AI-powered intelligent course creation tools to provide rapid online resource development. For example, an AI-course creation tool may be configured to perform automatic video splitting. For example, the AI-course creation tool automates the splicing of broadcast videos into palatable learning segments based on the content. In some implementations, other AI-powered tools with other functions may also be utilized by the platform. For example, AI-powered tools to identify, extract and adapt content from captured live broadcast, webinars and coaching sessions within the platform (restricted to content that is within the organisation's access) to support creation of new lessons and courses.

Figure 1A:
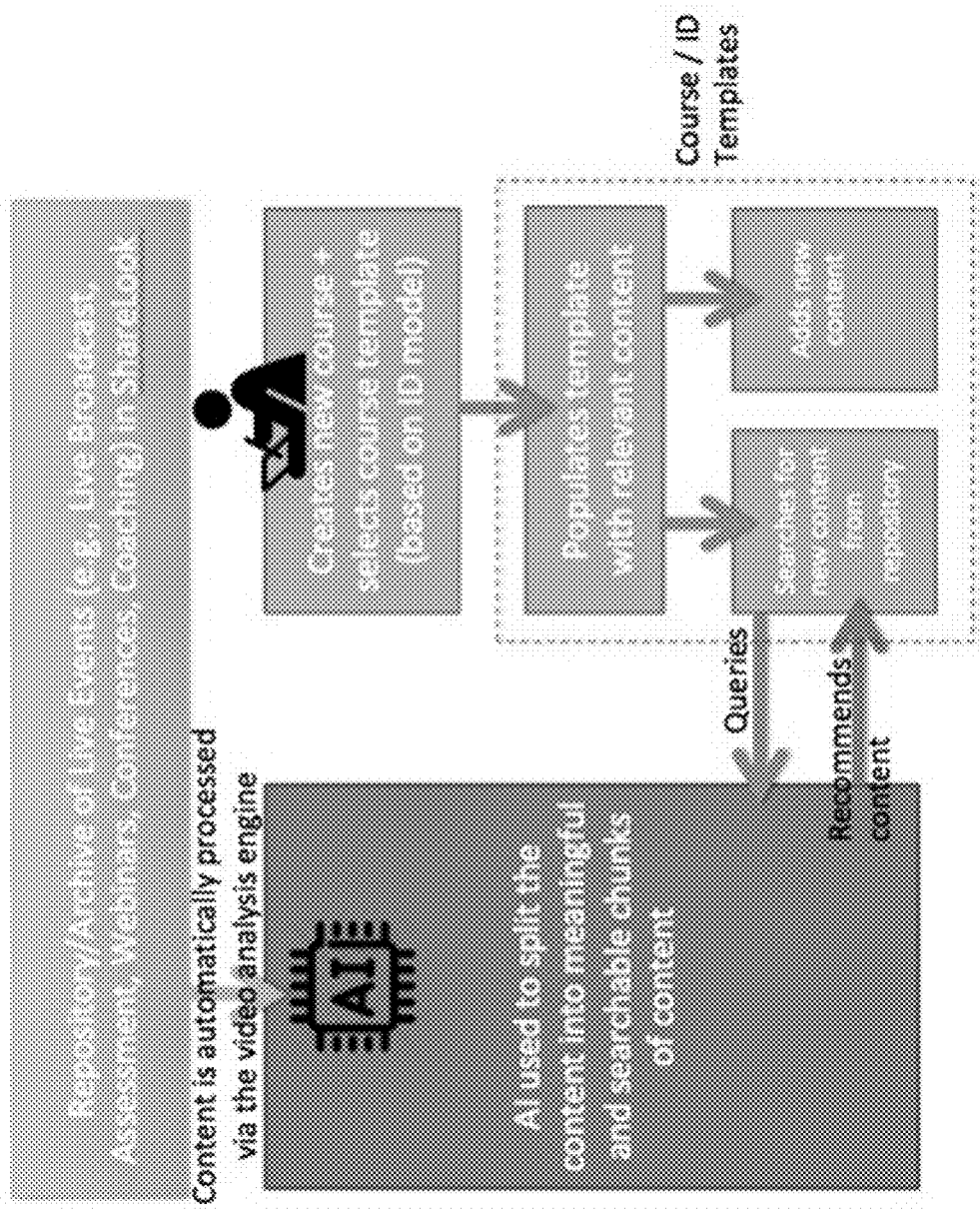
FIGS. 1a-1b show simplified diagrams of a framework of an AI-powered learning platform.
Figure 1B:
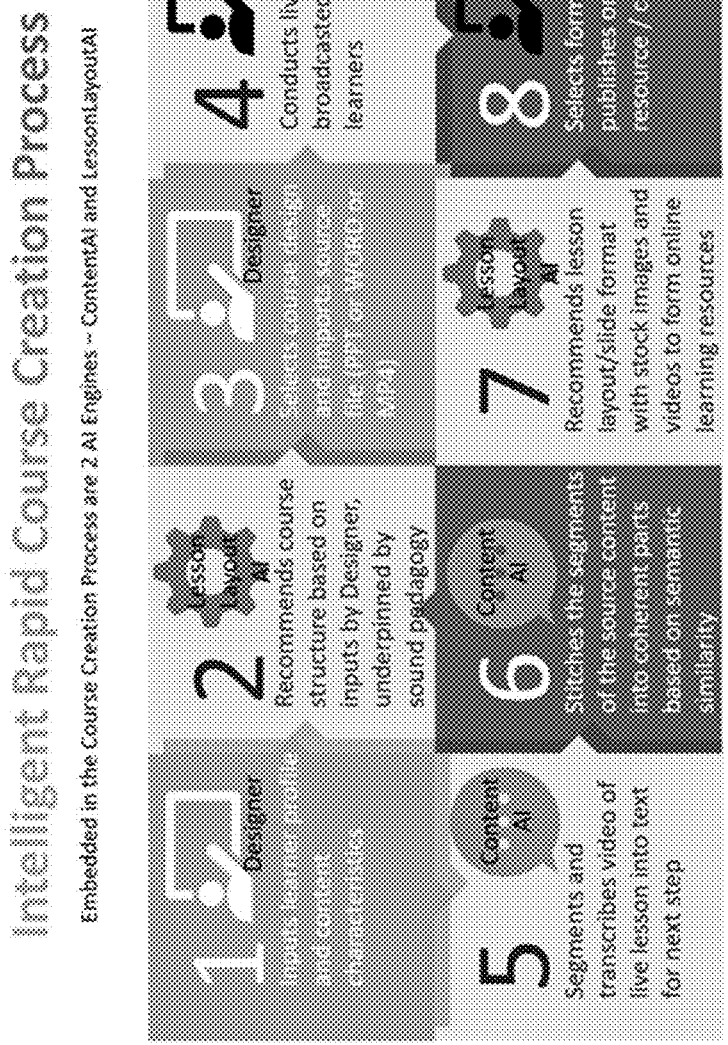

FIGS. 1a-1b show simplified diagrams of various frameworks of an AI-powered learning platform.

In one embodiment, the framework involves an intelligent course building process. For example, the course building process is an AI-assisted course building process. As shown in FIG. 1a, at the start of a course building process, a course builder is presented with a selection of learning design templates to select. The learning design templates are, for example, instructional design (ID) templates which are designed around established instructional design models for online learning. This ensures consistency of learning design across courses as the templates provide a logical structure to suit the learning design selected. It is understood that the course builder has the option to modify/tweak the course structure to better suit his training objective or purpose.

As for content generation of the new course, the users can either add their own content and/or use existing content within the platform. For example, the platform employs AI-powered tools to search and recommend appropriate or relevant content to the course builder based on a query input by the builder. The query can be provided in the form of a short phrase or even a sentence. For example, the query can be "what is the definition of customer service?". These queries, in natural language (as opposed to searching by tags, or using query strings), make it more intuitive to coure builders, hence, improving efficiency and user adoption.

In one embodiment, the search of relevant content for recommendation includes performing content extraction from existing learning objects stored within the repository of the platform including live events (i.e., Live Broadcast, Conference, Webinars, Coaching). For example, by using AI-powered tools to identify and split the content into meaningful chunks/topics, and subsequently recommend the relevant content (together with its context) based on real-world queries/questions input by course developers.

In addition, the platform may also perform semantic encoding of the content of the stored files within the platform using a NLP unit which is trained to interpret the local corpus (WeeTee, 2019; AISingapore, u.d.). The NLP unit is trained, for example, using feed forward propagation techniques (Haber & Ruthotto, 2019).

Figure 2A:
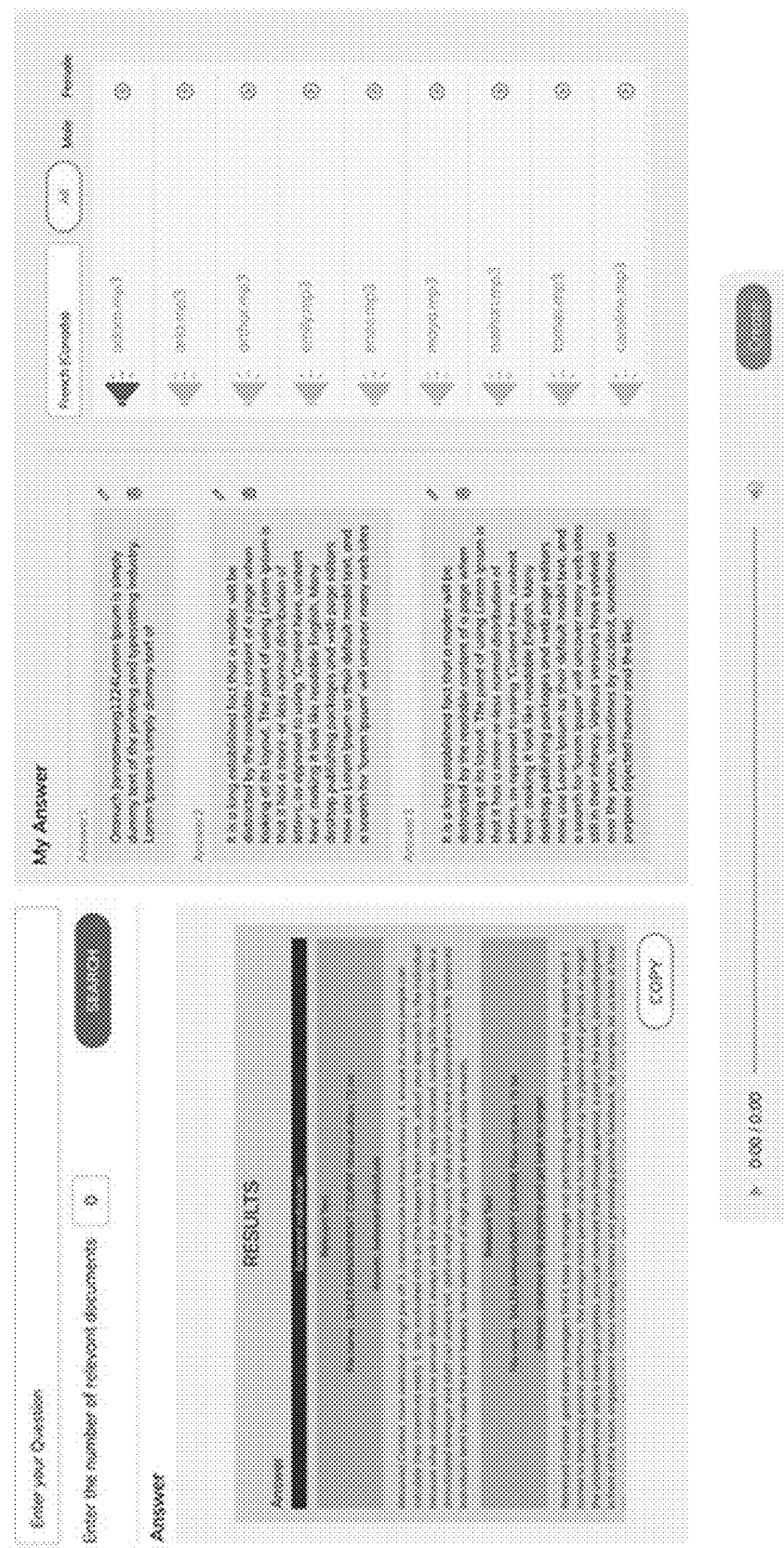
FIG. 2a shows a question answer section page or view of the platform.

FIG. 2a shows a question answer section page or view of the platform. As shown, the section page displays search results in response to a query input by a course builder. For example, the section page includes a query content box and an answer content box which displays search results in response to a query entered by the course builder. For example, when a course builder enters a query in the query content box and chooses a number of search results to display, a contentAI module of the platform utilizes AI-powered tools to identify relevant content pieces and displays them in order of relevance in the answer content box for the course builder to select.

In addition, other options such as copying and pasting the selected relevant content into the ID template of the new course, editing the selected relevant content, and/or creating an audio file based on the selected relevant content using text-to-speech engine provided by the platform to create a more media-rich output may also be provided.

Figure 2B:
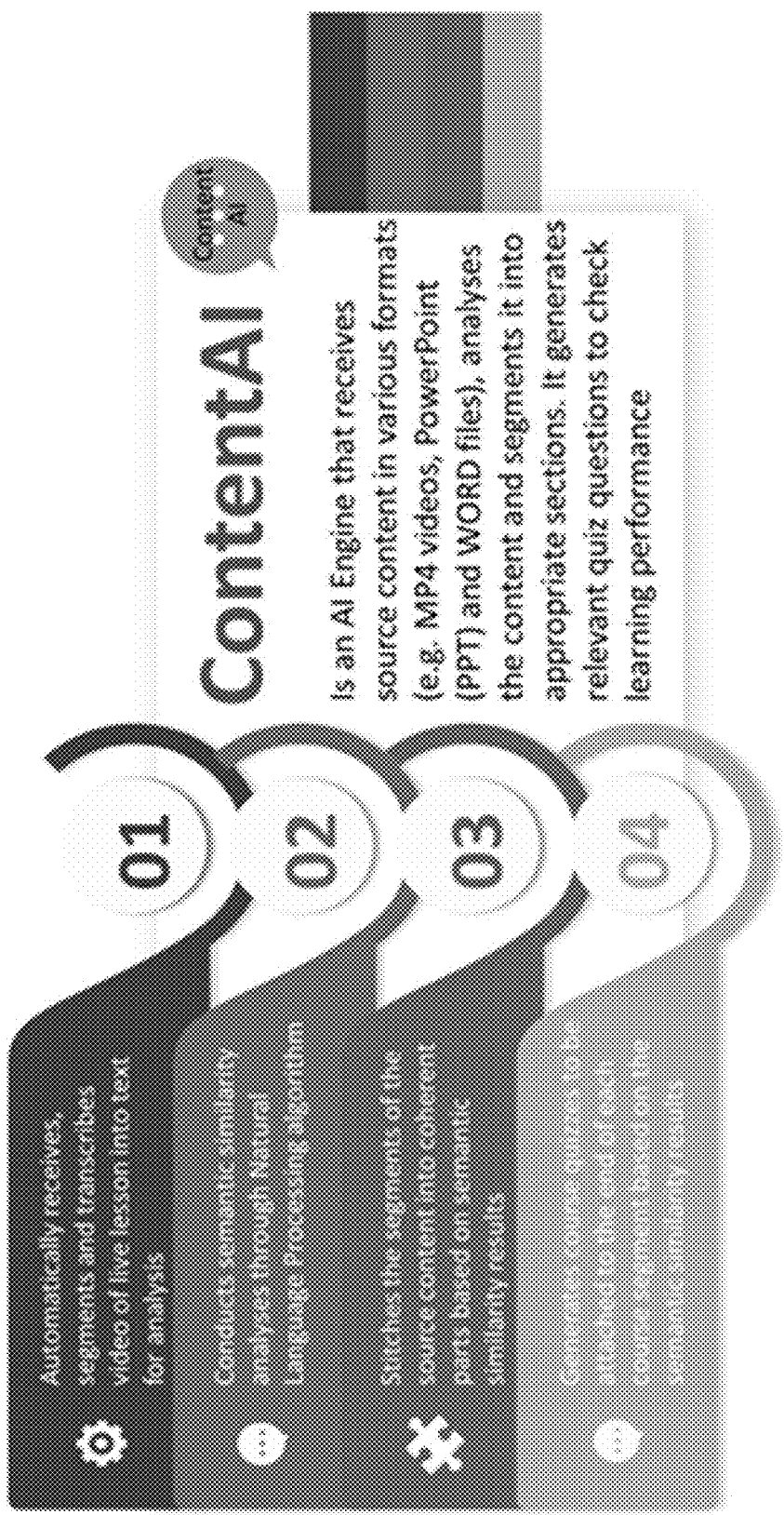
FIG. 2b shows a framework of a contentAI module of the platform.
Figure 3B:
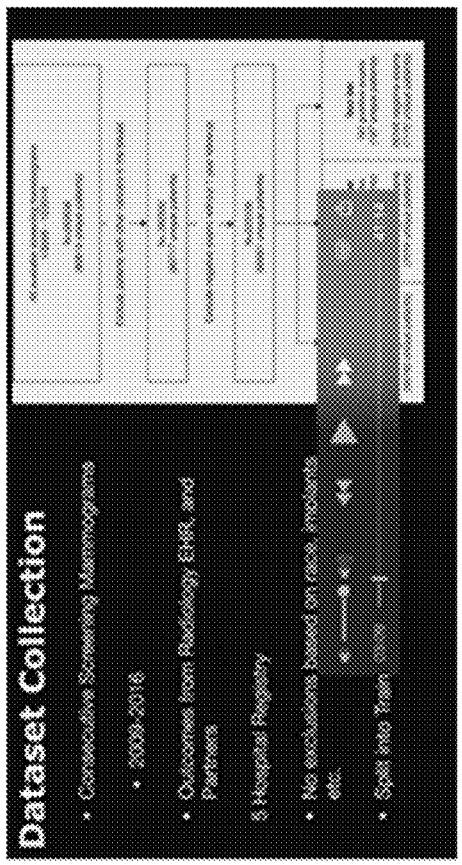
FIGS. 3a-b show various views of processing a video for video splitting.
Figure 3A:
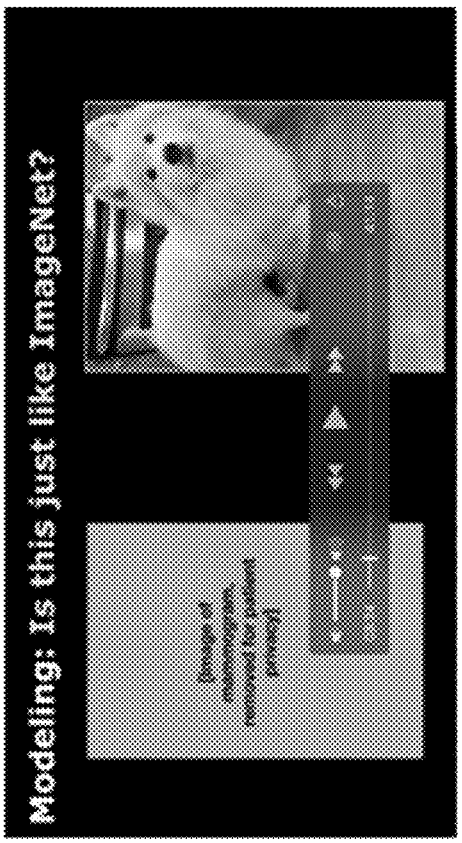

In one embodiment, the contentAI module searches from existing content within the platform including stored video content. For example, referring to FIG. 2b, the contentAI module employs AI-powered tools to perform video splitting function to split or slice a long video into short video segments which can be used as relevant content in new courses. In one embodiment, a video splitting process includes video processing, audio processing and/or text processing to identify changes in scenes, audio and/or topics. This is to ensure accurate splitting or slicing of a video frame at appropriate timestamps to generate logical and short video segments. For example, video processing is performed to determine changes in scenes. As shown in FIG. 3a, splitting a video frame at timestamp of 3:23 can be determined based on detecting a background change. Audio processing detects long pauses or a silent period. For example, a silent period can indicate an end of a sentence and therefore prevents a video from being split in the middle of a sentence. Referring to FIG. 3b, determining a timestamp for video split based on silence detection generates a timestamp of 3:09 which is different from the timestamp generated based on detecting background changes.

As for text processing, it employs NLP techniques to analyze transcripts such as keywords and/or sentence ends for determining appropriate timestamps for video splitting. In one embodiment, AWS transcript service may be employed for accurate transcripts of the videos and audios. A splitting method can be developed by applying suitable NLP methods on transcripts. Topic modelling methods can be employed to find the topics in a text. Topic modelling finds the semantic relationship between words in the documents to explore topics. Latent Dirichlet Algorithm (LDA) and Non-Negative Matrix Factorization (NMF) methods are widely used methods to perform topic modelling. After topic modelling is applied, each sentence in the transcript will be assigned to a topic. A splitting point can be determined when a topic of a previous sentence is different from a next sentence.

In addition to the topic modelling approach, the word embedding method is another alternative for detecting the topic changes. In word embedding, the words are represented in the form of vectors. Words with similar meaning have a similar representation. In other words, words closer in the vector space are expected to have a similar meaning. Since it can capture the context of the word in a document, we can employ it to detect topic changes. Each sentence is compared with the previous one using a similarity metric based on word embedding.

Preferably, video splitting is performed using all 3 processing techniques (video processing, audio processing and text processing) to find the most optimal time stamps for generating short video segments from a single long video. FIG. 3c shows an exemplary table of timestamps of start and end timings determined for each video segment of a video processed for video splitting.

In one embodiment, video splitting of video content can also be performed on live broadcast video recordings. For example, live recordings can be analyzed by a video analysis engine module of the platform for the purpose of video segmentation and clustering subsequently. In such cases, the workflow includes the following steps:

1) The trainer or course builder delivers lessons (via live broadcast tool in the platform or a recording) or using their own video camera and automatically uploads the video into the platform.
2) The course builder indicates that the live session is to be converted into a video resource that is part of a lesson with the pre-selected theme and course structure.
3) ContentAI module analyses and identifies sections within a video and splices the individual clips for each of the sections.

Figure 4:
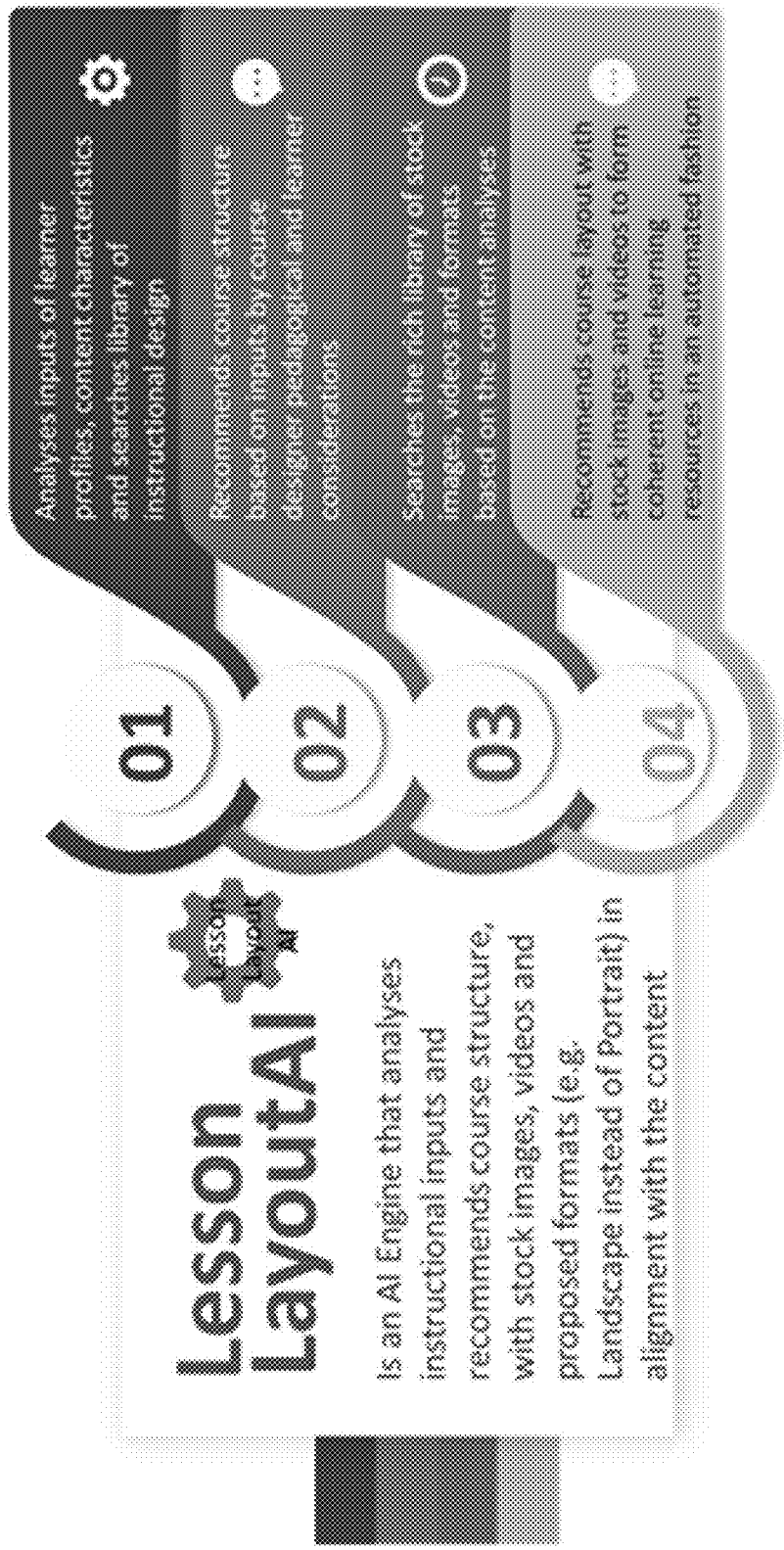
FIG. 4 shows a framework of a LessonLayoutAI module of the platform.

In one embodiment, the platform includes a LessonLayoutAI module configured to recommend appropriate visuals and other multimedia components to complement the content that is to be used. Referring to FIG. 4, the LessonLayoutAI module, in one embodiment, employs a matching engine which automatically matches and recommends digital resources (images, videos, audio) from the digital library after a ID template is selected for the new course. For example, the digital resources are recommended based on the content that was imported by the course builder.

Preferably, these digital assets will automatically fill up any blank spaces or placeholders for the course builder to ensure a seamless flow of coherent visual and audio content and supporting resources. The approach development method will be, a searchable database is designed to retrieve relevant digital resources from the libraries. Some relevant keywords can be defined for each digital asset. For the videos and audios, keywords are extracted from the transcripts. For the images, keywords can be extracted using the names of the objects in the images. Keywords are extracted from the texts in different types of files. Keyword extraction is performed using some NLP methods such as TextRank and TF-IDF. Some advanced information retrieval methods such as the Elasticsearch method and BM25 algorithm can be employed for effective matching and recommendation process.

In one embodiment, the LessonLayoutAI module also facilitates to automate the process of switching digital resources between landscape and portrait formats. This enhances user experience as online resources in landscape format tend to be preferred for viewing on personal computers and tablets while those in portrait format may be preferable for viewing on mobile phones. By allowing for toggling between the two formats, designers can generate two versions of the same resource to fit different learner profiles with their respective devices.

Figure 5:
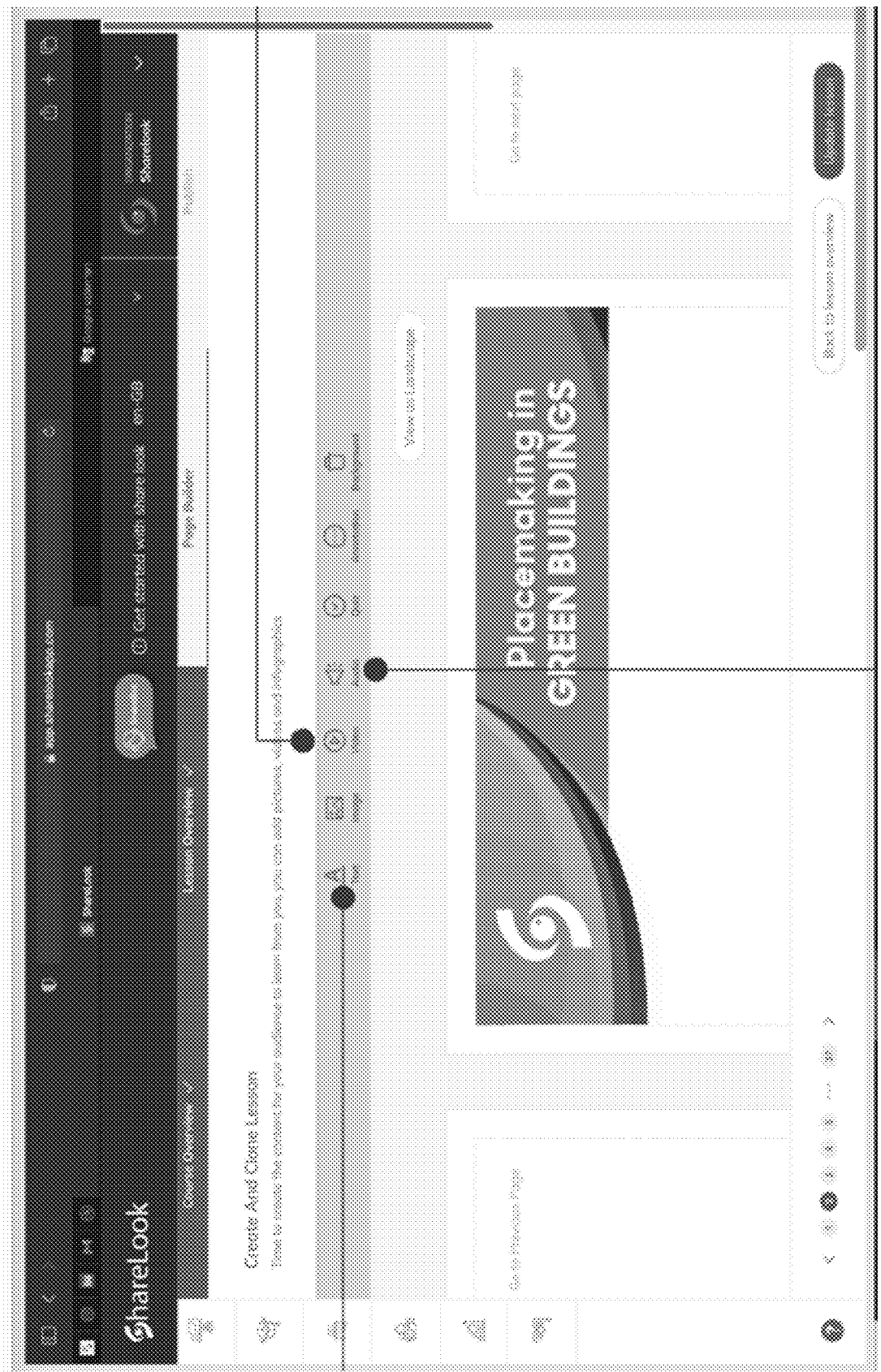
FIG. 5 shows a course create overview page of the platform.

FIG. 5 shows a course create overview page of the platform. For example, the overview page is displayed when a user selects a create course function of the platform. As shown the overview page displays a scenario page of a new course. An ID template may be applied to the scenario page of the new course. For example, the ID template is selected by the user from a series of ID templates recommended by the platform. In one embodiment, the overview page includes various options for the user to insert/edit different content types. For example, the user can select a text option for inserting text content, a video option for inserting video content or an audio option for inserting audio content.

Figure 6A:
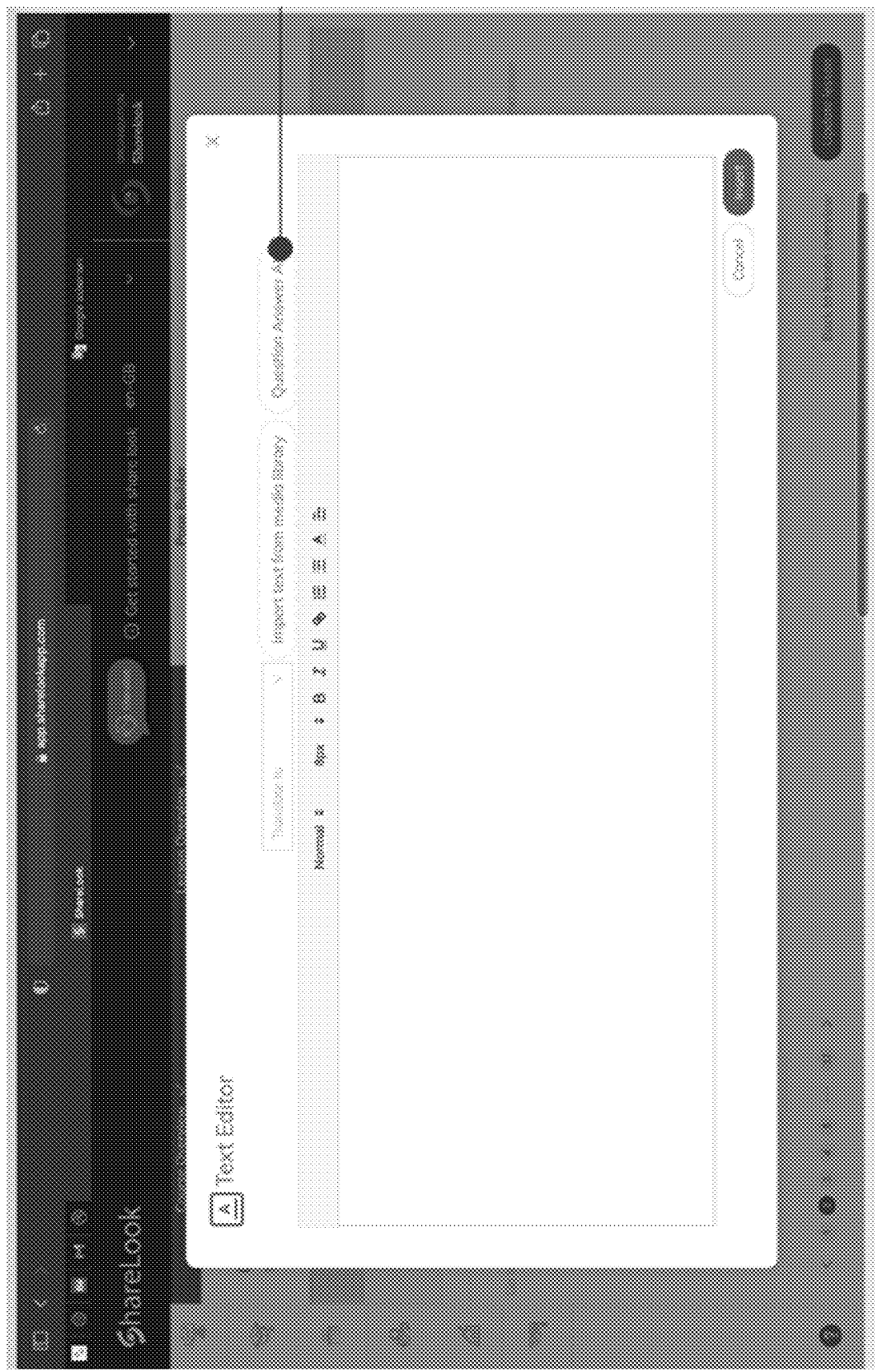
FIGS. 6a-6e show a process flow of generating text content for the scenario page of a new course.
Figure 6B:
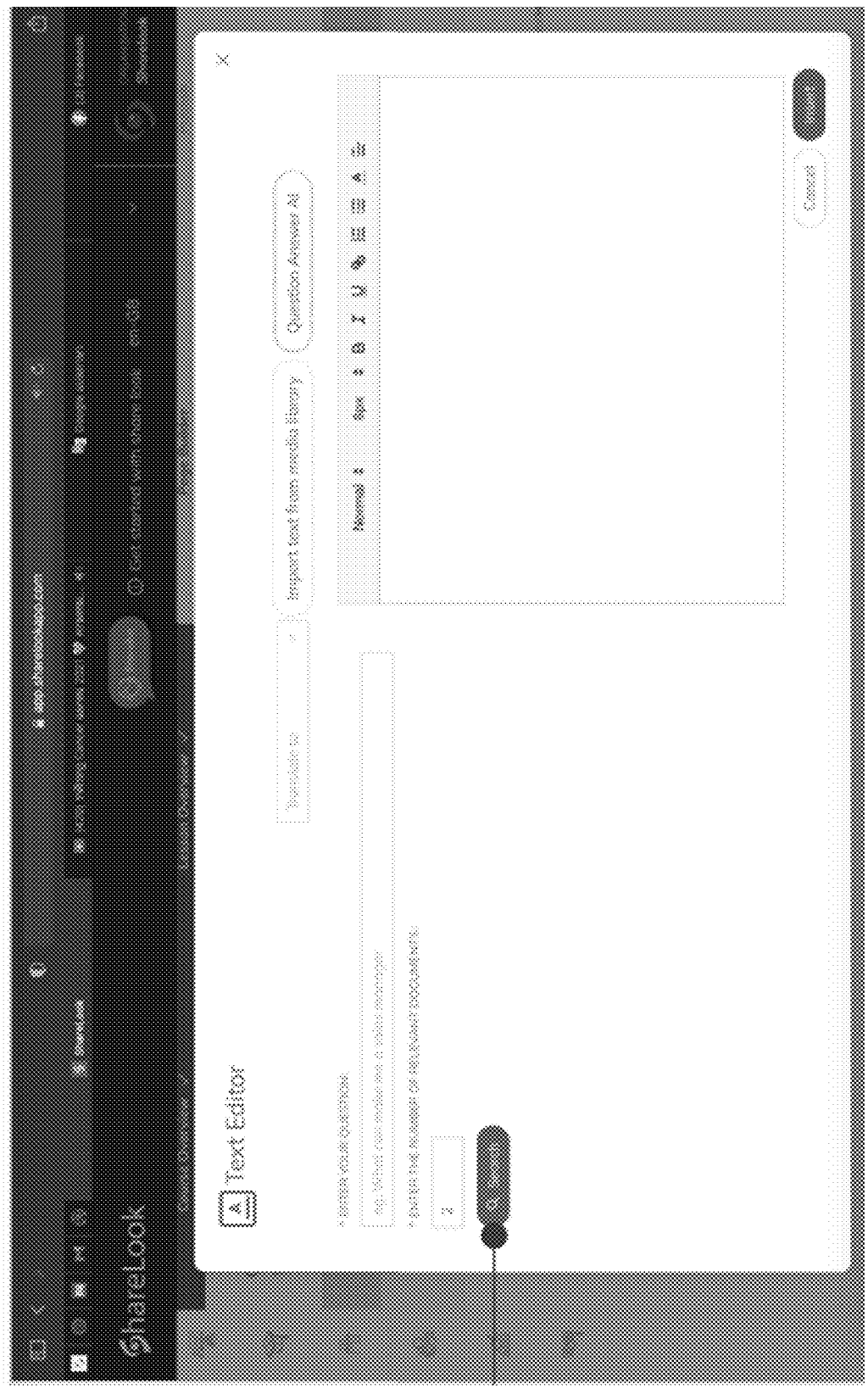

FIGS. 6a-6e show a process flow of generating text content for the scenario page of a new course. As shown in FIG. 6a, a text editor section view is displayed when the user selects a text option provided on the course create overview page. The user can select a question answer AI option to search for relevant content within the platform that can be incorporated into the new course. In FIG. 6b, a question answer AI section view is displayed after the user clicks the question answer AI option. The user can input a query in the query content box and select a search option to initiate an AI-assisted process to search for relevant content within the platform.

Figure 6C:
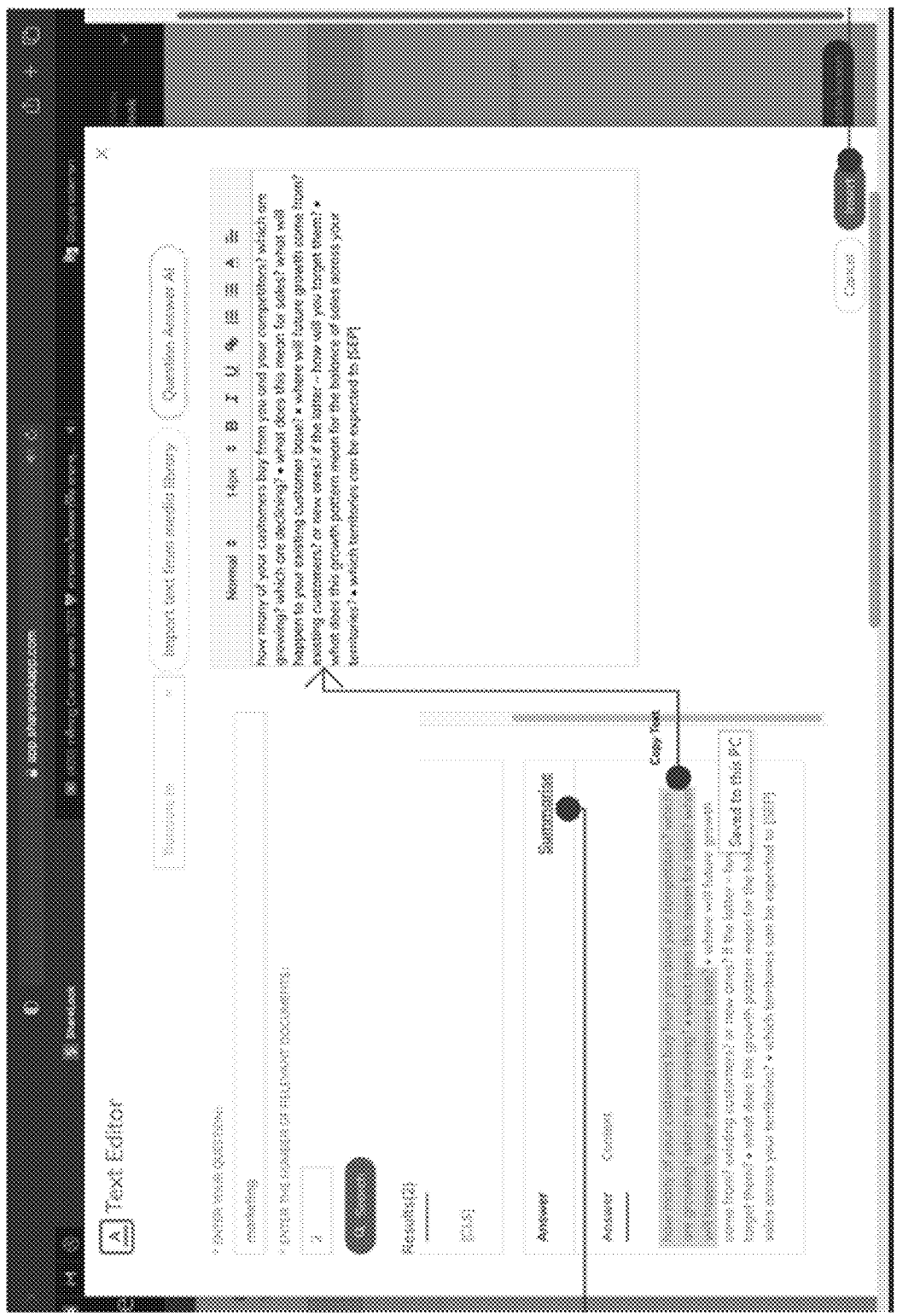
Figure 6D:
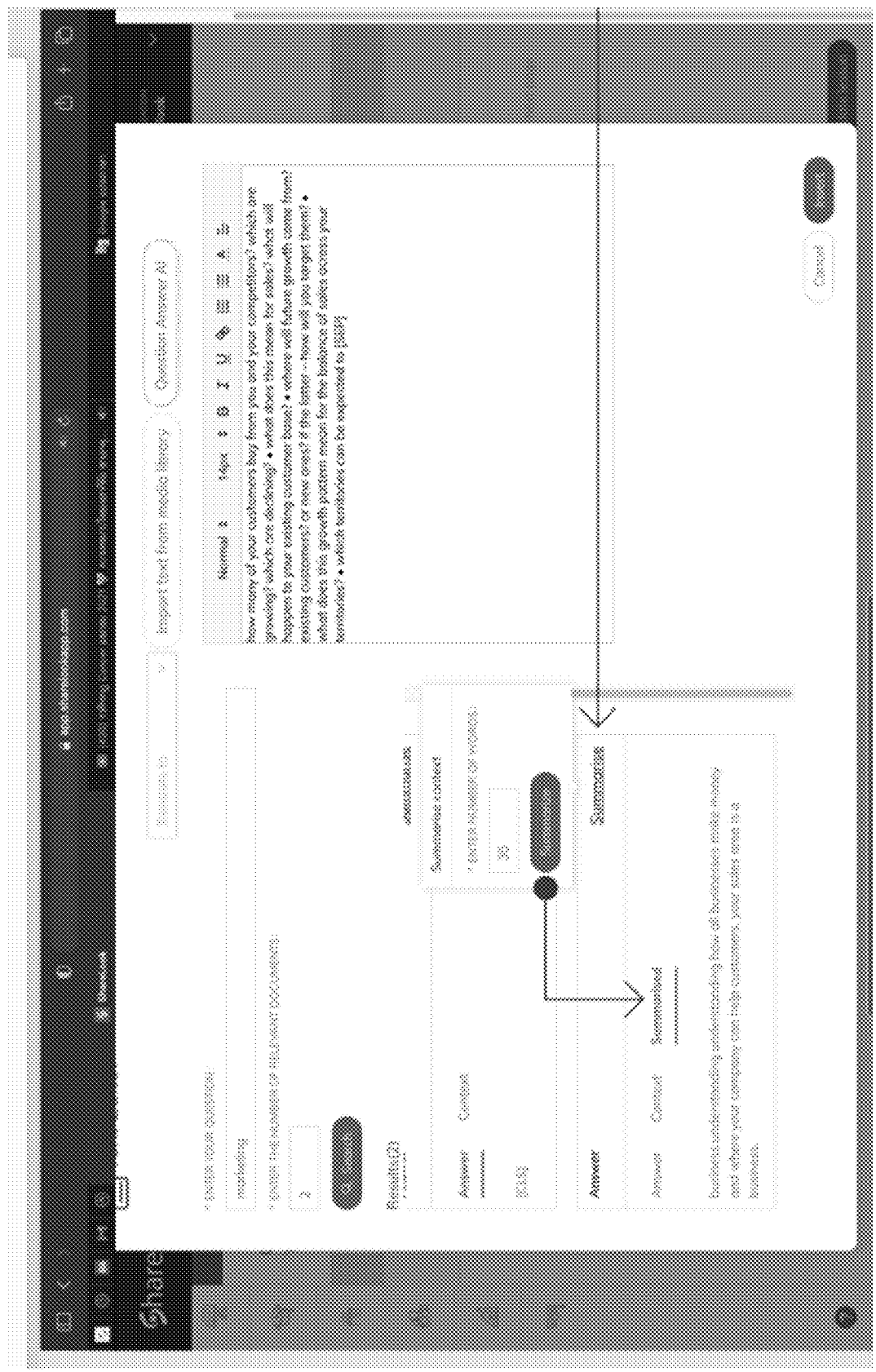
Figure 6E:
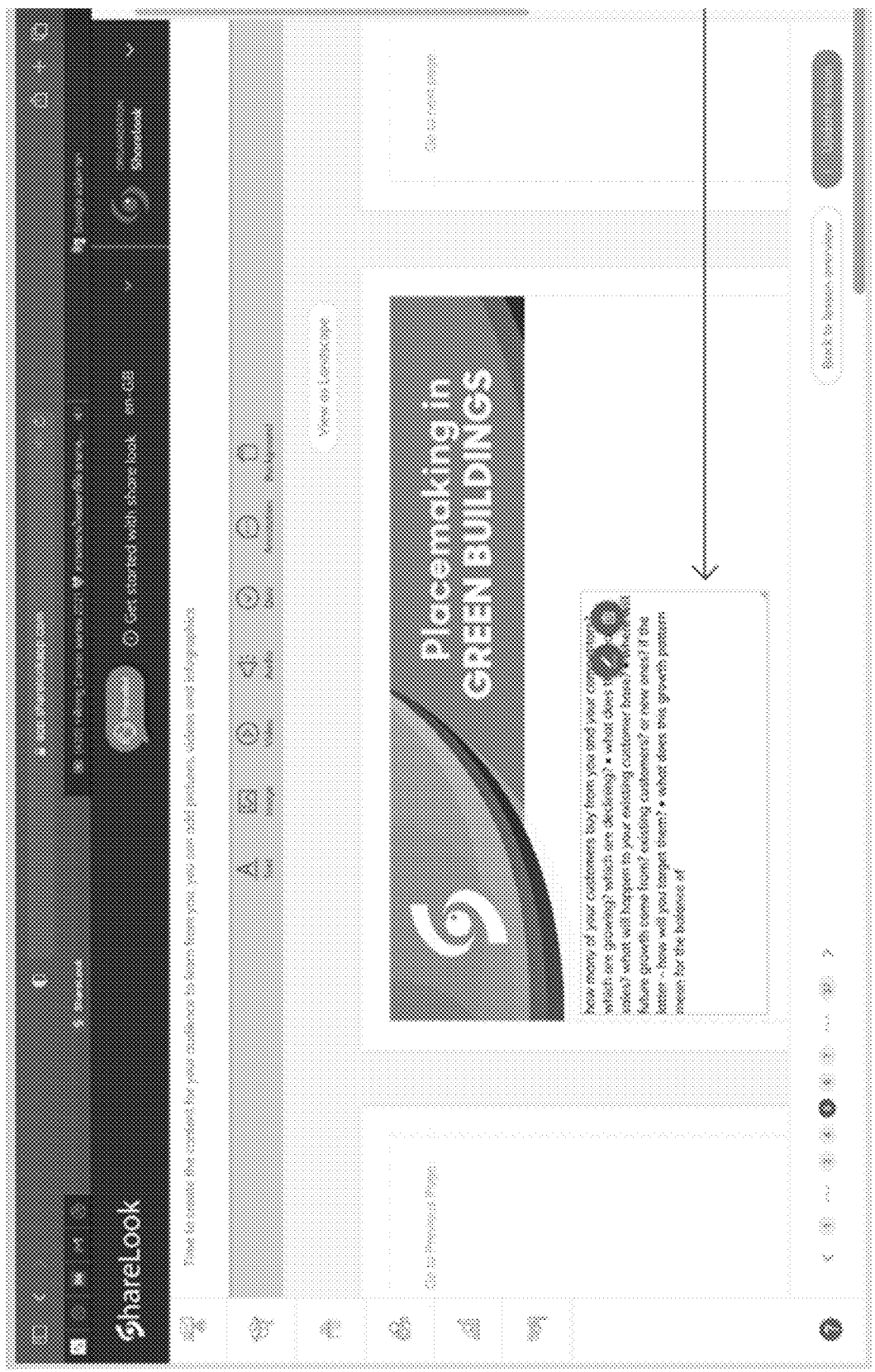

As shown in FIG. 6c, search results based on the entered query are displayed on an answer content box. The user can select to copy any text content displayed in the answer content box and paste the copied text content into an input content box. The user may also choose to view a summary of a selected text content. For example, in FIG. 6d, clicking a summarize option allows the user to set a word count limit for the summary of the selected text content to be displayed. Once the user is satisfied that no further changes are required, the user may select an insert button which causes the text content in the input content box to be inserted into the scenario page of the new course as shown in FIG. 6e.

Figure 7A:
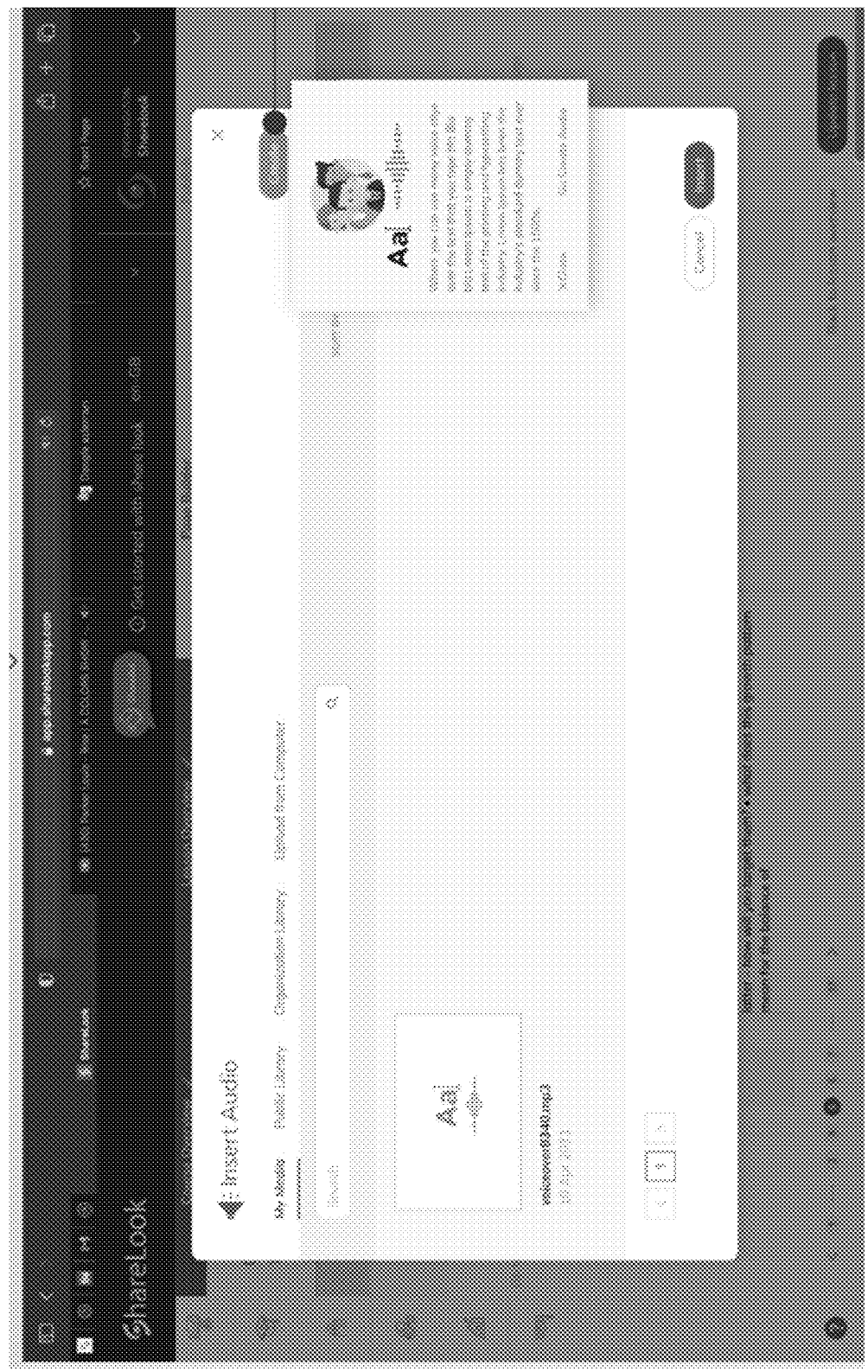
FIGS. 7a-7e show a process flow of generating audio content for the scenario page of the new course.
Figure 7B:
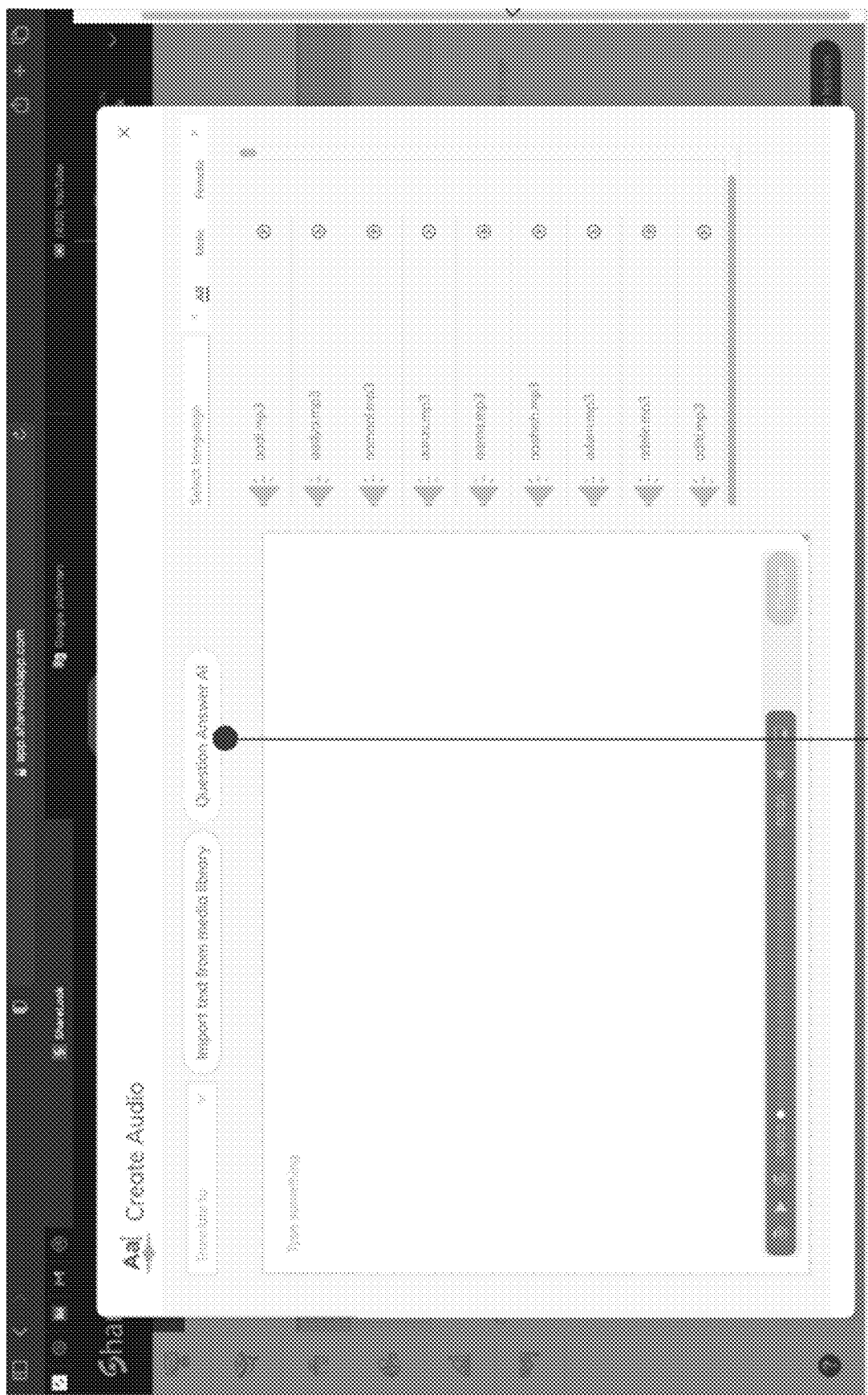

FIGS. 7a-7e show a process flow of generating audio content for the scenario page of the new course. As shown in FIG. 7a, an insert audio section view is displayed when the user selects an audio option provided on the course create overview page. The insert audio section view includes options for the user to select inserting an audio from my media, public library, organization library or from user's local client device. Alternatively, the user may choose to create an audio file by selecting a create option. Selecting the create option causes a create audio section view to be displayed, as shown in FIG. 7b.

Figure 7C:
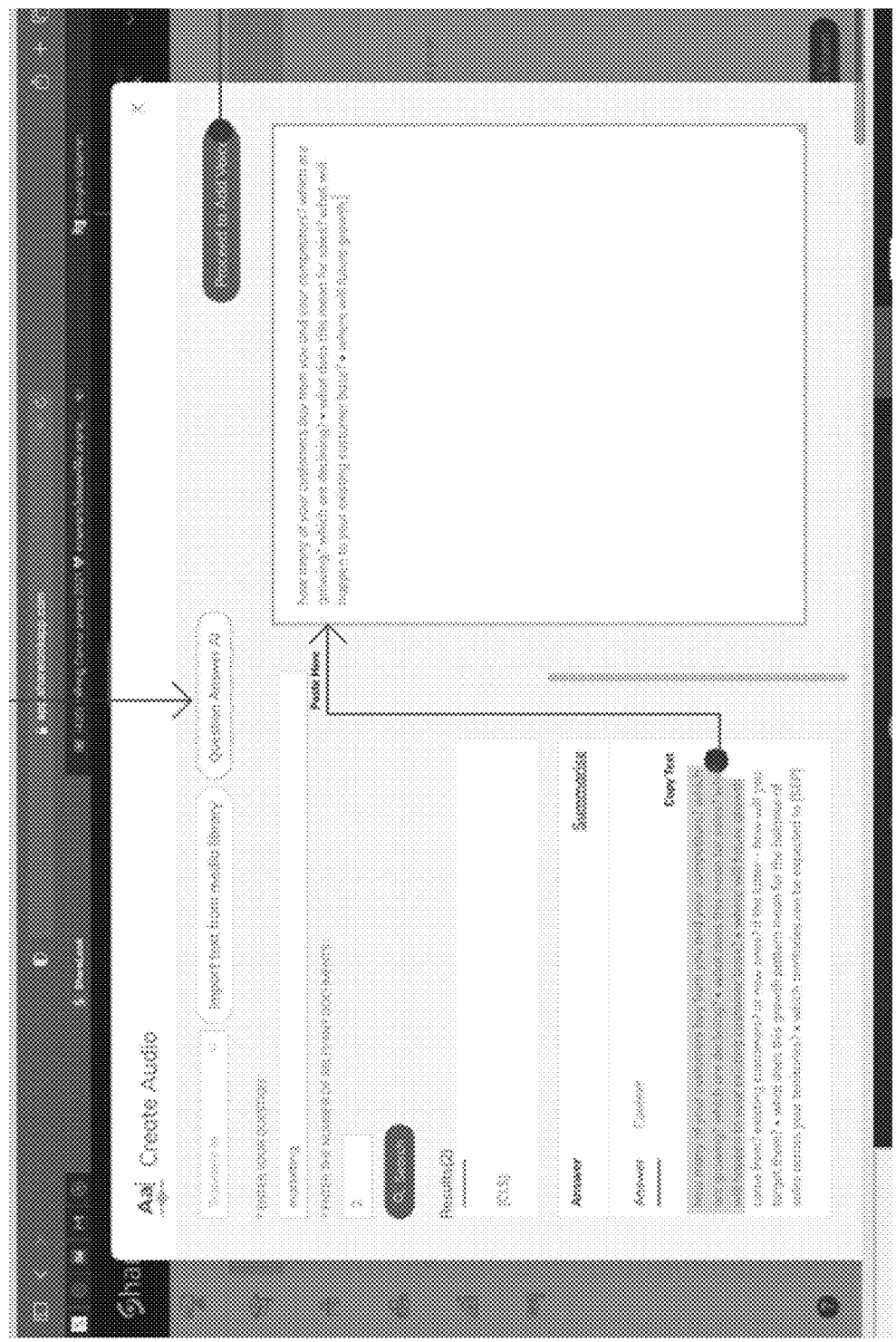

In FIG. 7c, a question answer AI section view is displayed after the user clicks the question answer AI option. The user can input a query in the query content box and select a search option to initiate an AI-assisted process to search for relevant content within the platform. Search results based on the entered query are displayed on an answer content box. The user can select to copy any text content displayed in the answer content box and paste the copied text content into an input content box. Alternatively, the user may also choose to view a summary of a selected text content. The user may choose to select a voice for presenting the text content in the input content box. For example, the user can click on a proceed to add voice option to convert the text content to audio content.

Figure 7D:
Figure 7E:
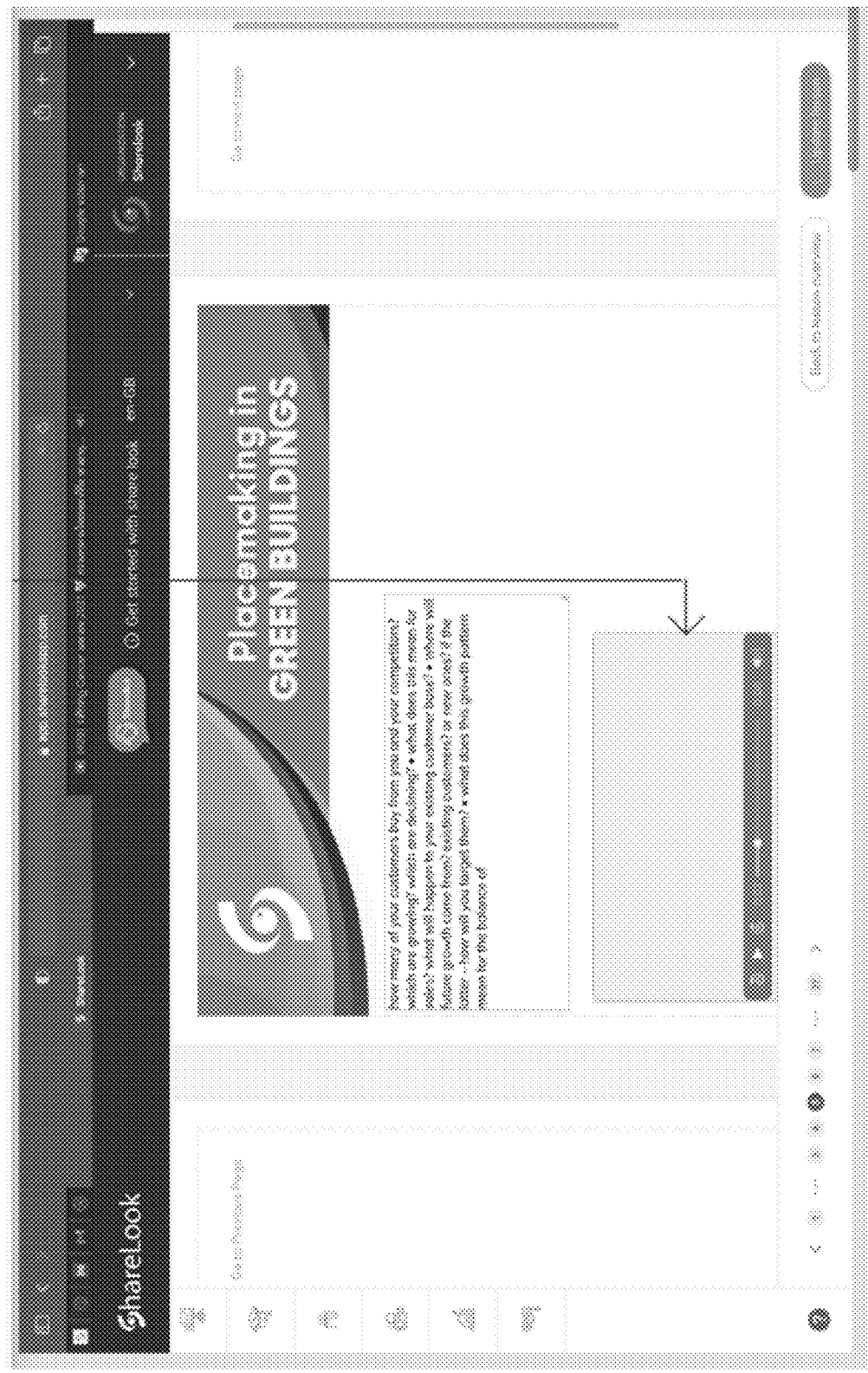

Clicking on a proceed to add voice option cases the section view to display a list of voices for the user to select as shown in FIG. 7d. For example, the user can select any of the voice options to present the text content. Selecting the create option cases the audio file to be created and displayed on the scenario page of the new course as shown in FIG. 7e.

Figure 8A:
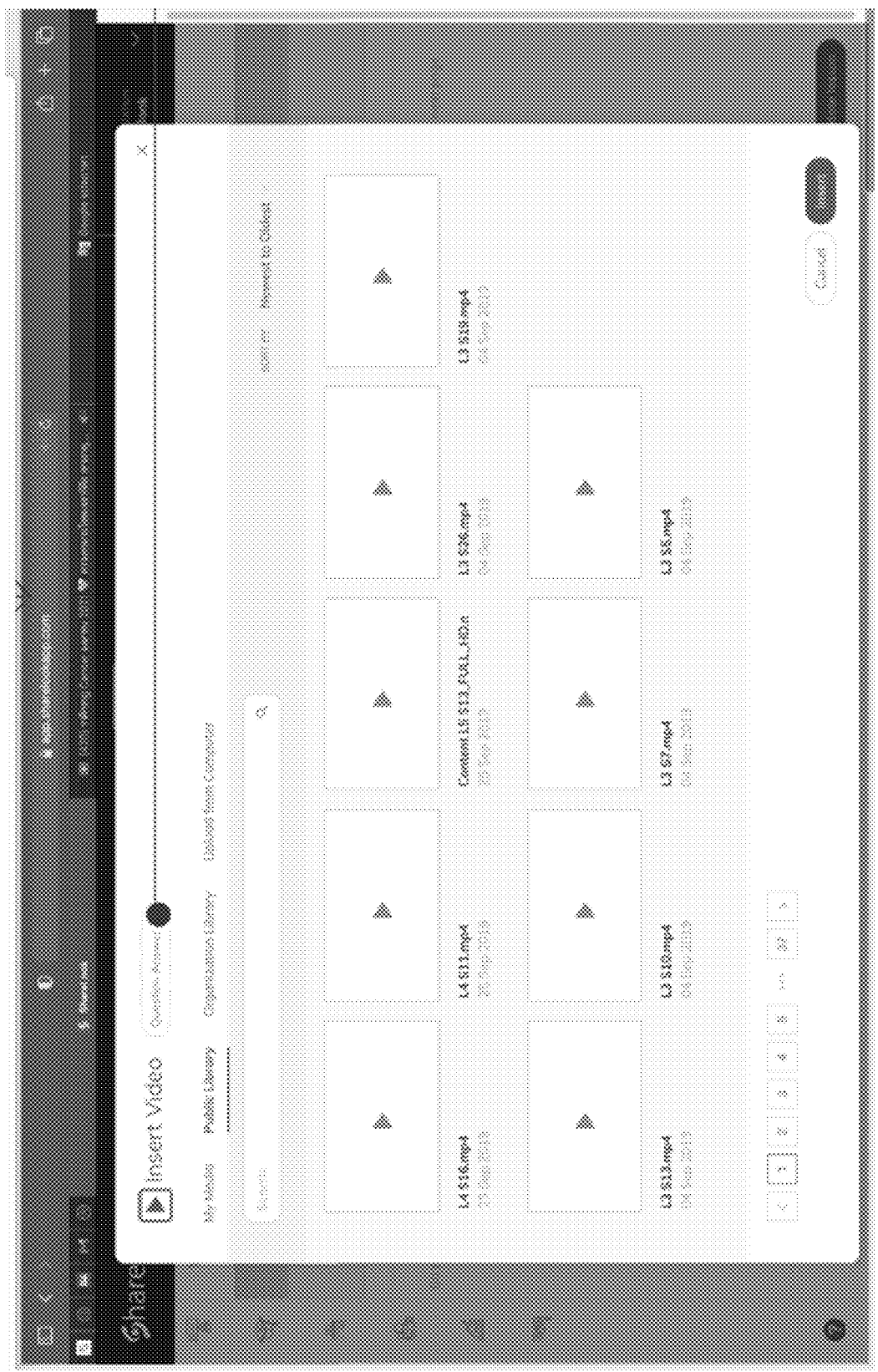
FIGS. 8a-8c show a process flow of generating video content for the scenario page of the new course
Figure 8B:
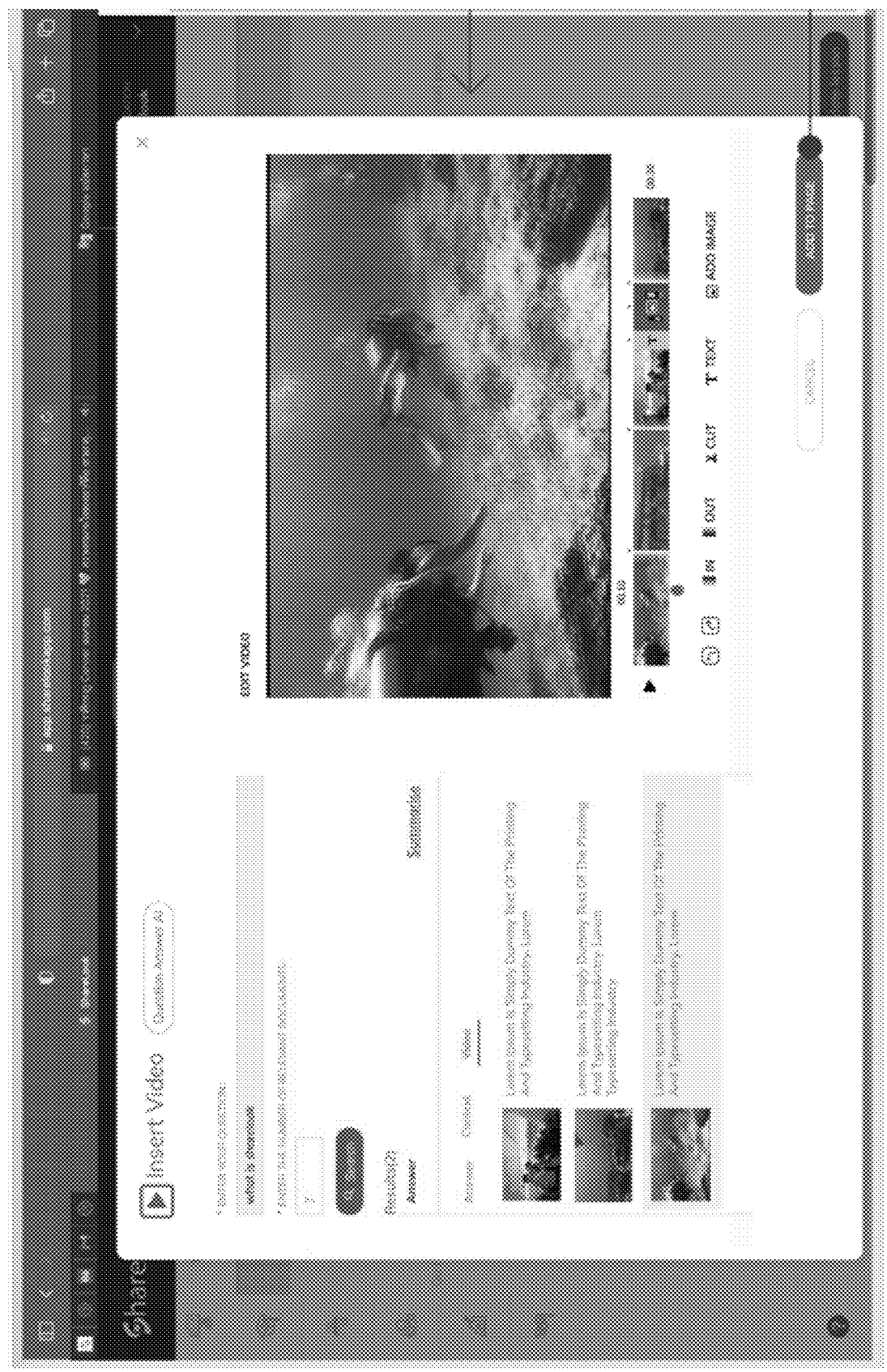
Figure 8C:

FIGS. 8a-8c show a process flow of generating video content for the scenario page of the new course. As shown in FIG. 8a, an insert video section view is displayed when the user selects the video option provided on the course create overview page. The insert video section view includes options for the user to select inserting a video from my media, public library, organization library or from user's local client device.

Alternatively, the user can select a question answer AI option to search for relevant content within the platform. In FIG. 8b, a question answer AI section view is displayed after the user clicks the question answer AI option. The user can input a query in the query content box and select a search option to initiate an AI-assisted process to search for relevant content within the platform. Search results based on the entered query are displayed on an answer content box.

The user can choose to view search results for video content by selecting a video tab provided in the answer content box. The user can choose to select a video from the search results for editing. For example, the user can edit a selected video in an edit video section provided by the insert video section view. For example, the user can choose to cut the video, or add text or images to the selected video. Once the user is satisfied that no further changes are required, the user may select a add to page button which causes the video content to be inserted into the scenario page of the new course as shown in FIG. 8c.

As discussed, the platform empowers training institutions and enterprises to build and strengthen their internal Learning and Development capabilities, through AI support and rapid course creation tools, speed up the design, development and implementation process for online courses with ID templates, rich library of quality content and intuitive text-to-speech tools and also support companies on their digital transformation journey by providing a rich media, multi-platform training solution. In addition, it also provides an enriching learning experience for learners with the use of local AI corpus and voices with local accents.

With the present AI-driven learning platform, it now possible for existing content to be intelligently and automatically analyzed and segmented into small, contextually-identified chunks of information. Organizations have vast amounts of valuable content and information that can be shared and used across many courses and users. In particular, the wealth of information captured in webinars, live events, conferences, etc. is all too often not effectively and efficiently captured and meaningfully chunked and tagged such that that information can be searched and used (or re-used) in other situations, courses or contexts. For example, there are User-interface (UI) inconsistencies when incorporating a Learning Object into a new course and Learning Objects not being contextually sensitive, resulting in them being inadequately specific for use in different courses.

The AI-driven learning platform empowers the transformation of that limitation. When fully matured, the wealth of information that exists in digital form within an organization can be more effectively harnessed through the use of the platform.

In one embodiment, the learning platform enables the creation of a live training event which is broadcasted live online to one or more participants. The live event, for example, may be created by a coach or trainer. In the case of multiple participants, a live online training session is provided to multiple participants. The trainer may also create a live training event tailored for a specific trainee. In such cases, a live one-on-one online training session is created for online training. In some instances, multiple trainers may be involved in the training with either multiple or a single participant.

The live event enables interactions between the participants and the trainer. For example, questions may be asked by participants and the trainer can provide instant answers accordingly. In addition, the trainer can provide feedback as to the performance of the participants.

The live event, after completion, is archived automatically and become past live events. Past live events can be streamed by subscribers whenever they want. Past live events are tagged with keywords, enabling them to be easily retrieved for streaming.

The training platform enables the creation of the live event to be run on different systems or platforms. For example, the live event may be created to run on a mobile phone, laptop or desktop. The live event may be configured to run on different operating systems, such as IOS, Android, PC as well as other types of systems.

In addition, the training platform may include a marketplace. This enables services, such as from coaches, to be listed and sold to interested consumers, such as trainees. The marketplace facilitates the dissemination of services and accessibility of such services in a central location or website.

In addition, the platform may also employ AI-powered tools to facilitate the creation of new live broadcast events based on past live events or even lessons which may exist in the platform library or archives. For example, segments of past live events, such as video features, may be imported to create a new live broadcast event.

As an illustration, an instructor wishes to deliver a lesson via live broadcast tool in the learning platform. The instructor may indicate that he wants the event converted to a lesson when he created the event. This includes selecting a theme and a model. The platform uses AI to take the recorded live event video and intelligently splits it into shorter clips, audio, images and transcodes the text. The system utilizes AI to select the appropriate video, images and text to populate the selected template. The instructor may edit the template with the AI selected content to fine-tune it to meet his course outcomes. The instructor may publish the newly created course and deploy it to his students or in the marketplace.

Figure 9A:
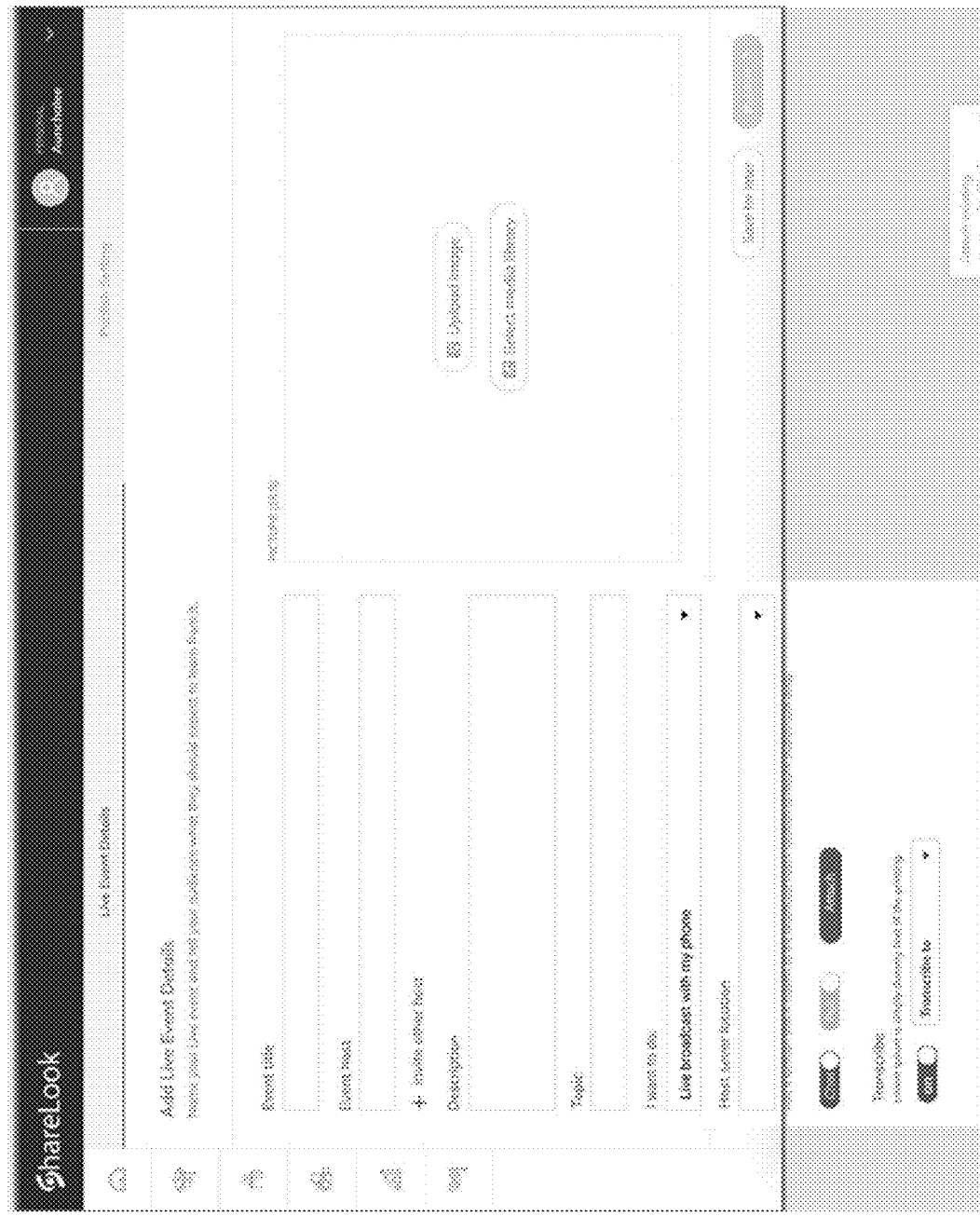
FIGS. 9a-9b show a process flow of generating live event content for a new course.
Figure 9B:
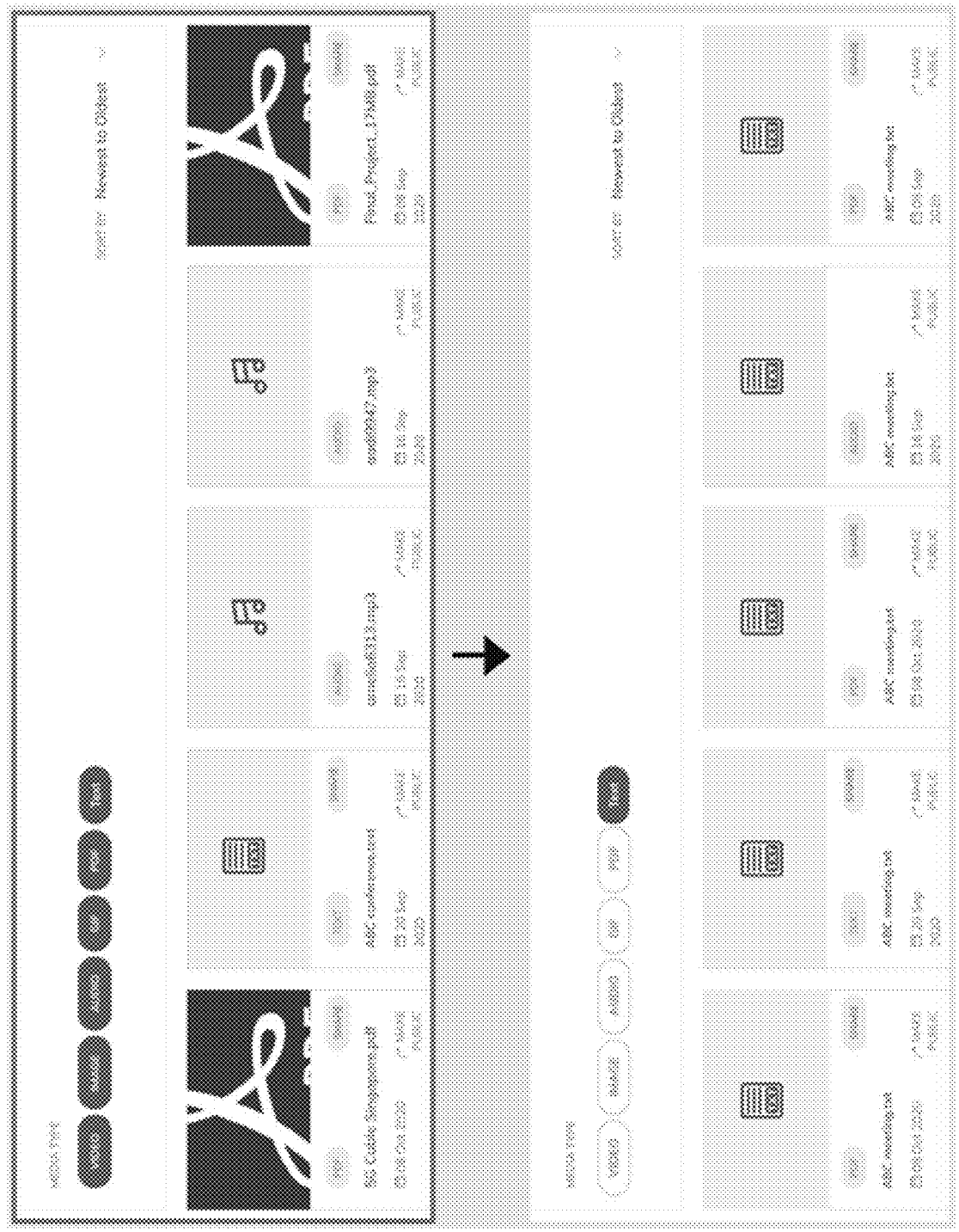
Figure 10A:
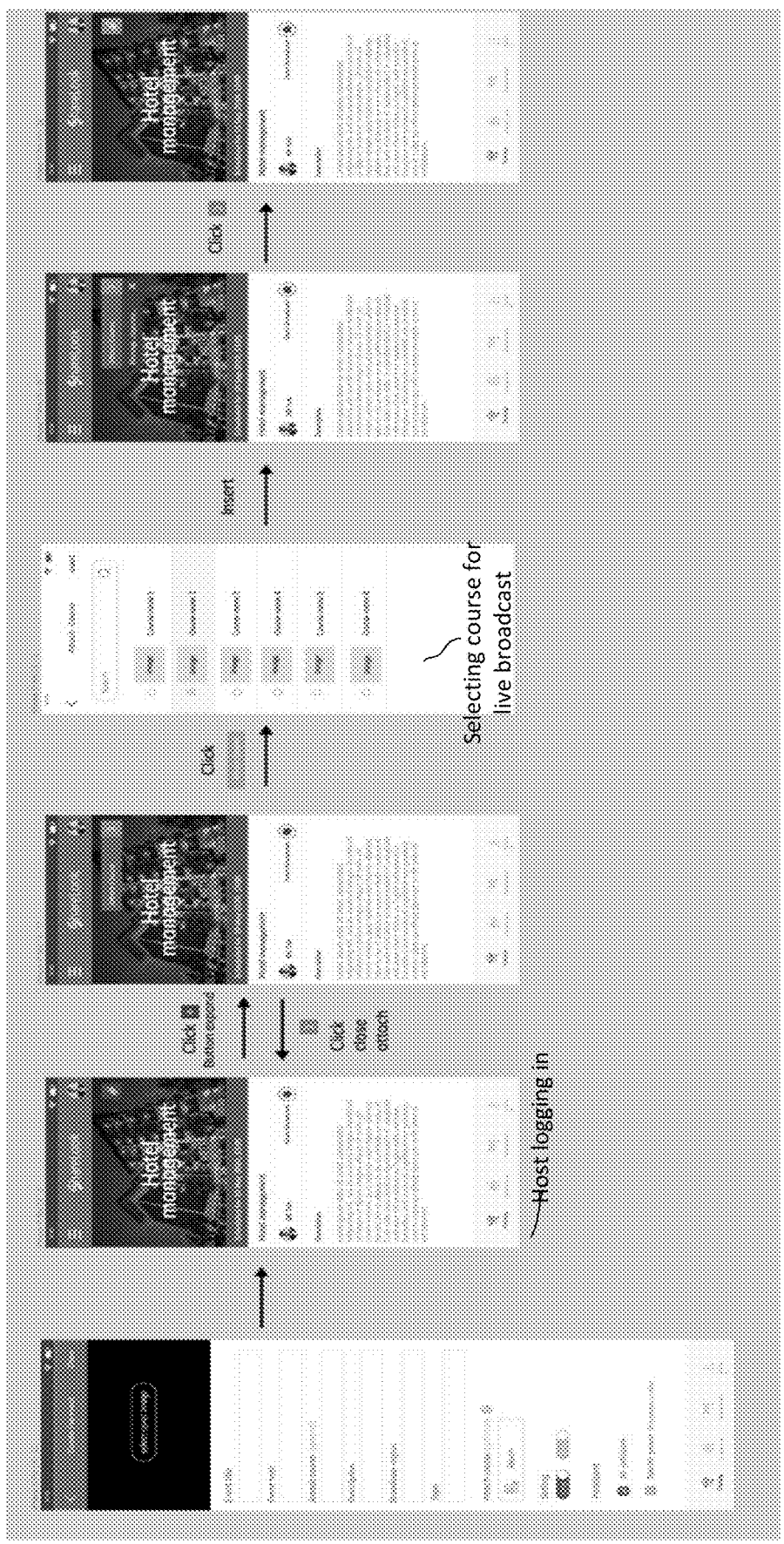
FIGS. 10a-10d show exemplary views of generating live event content for multiple viewers.
Figure 10B:
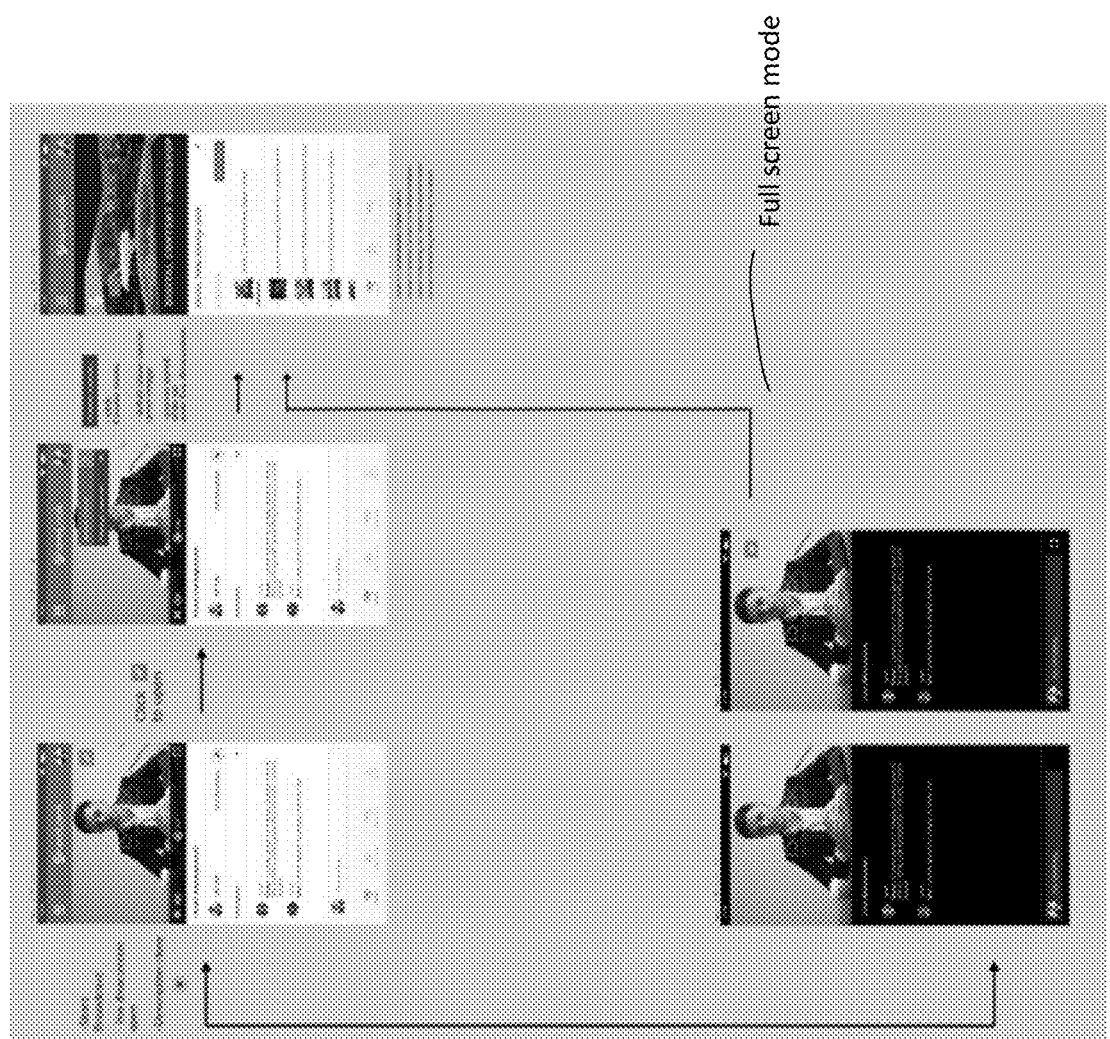
Figure 10C:
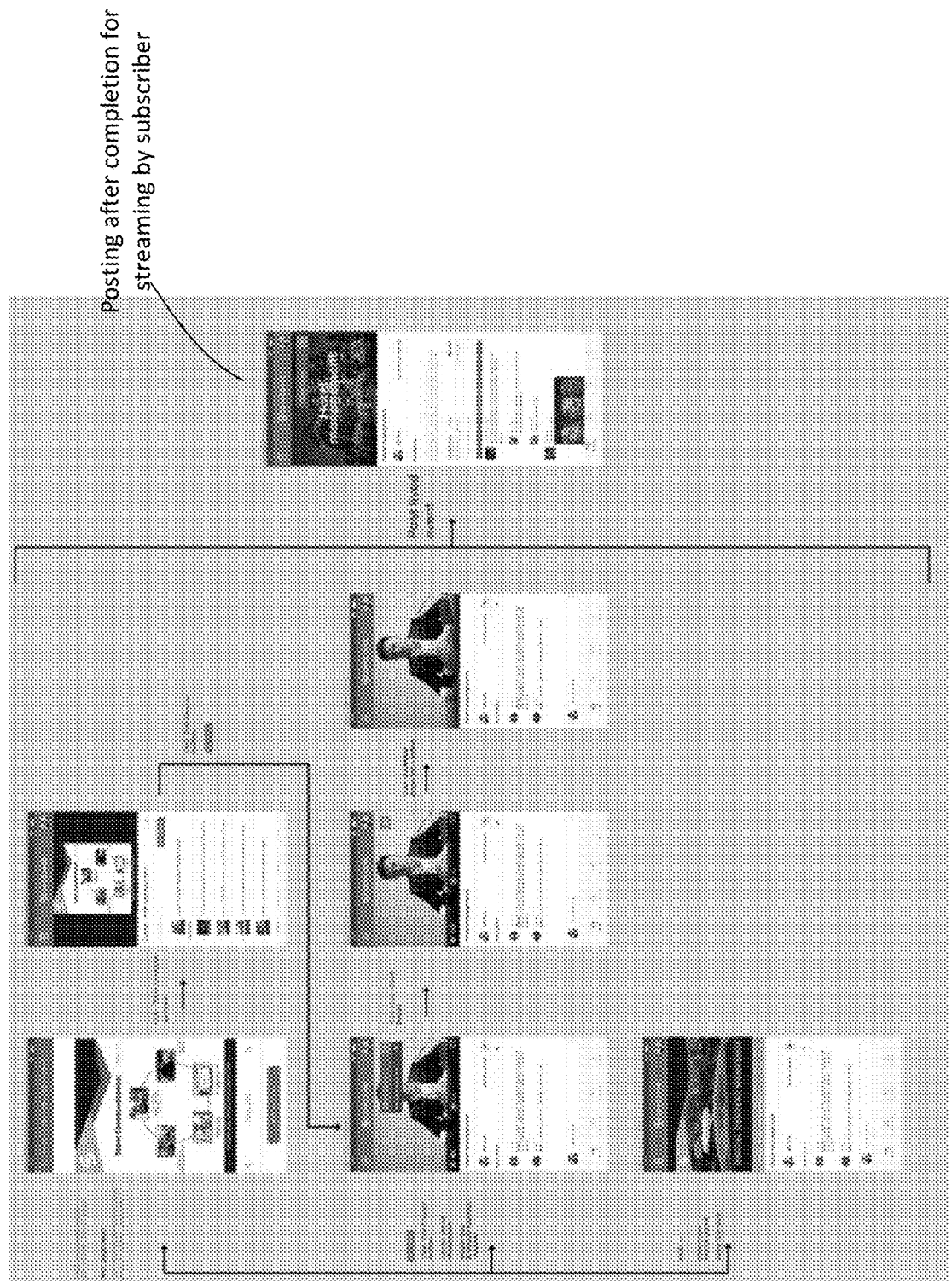
Figure 10D:
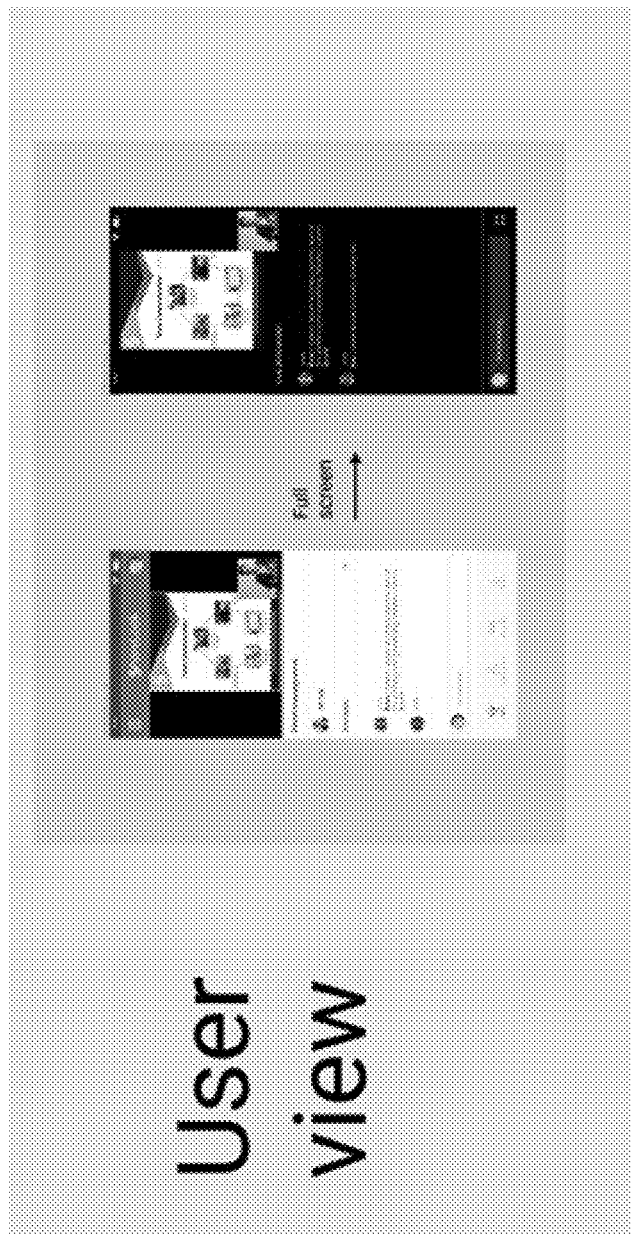
Figure 11A:
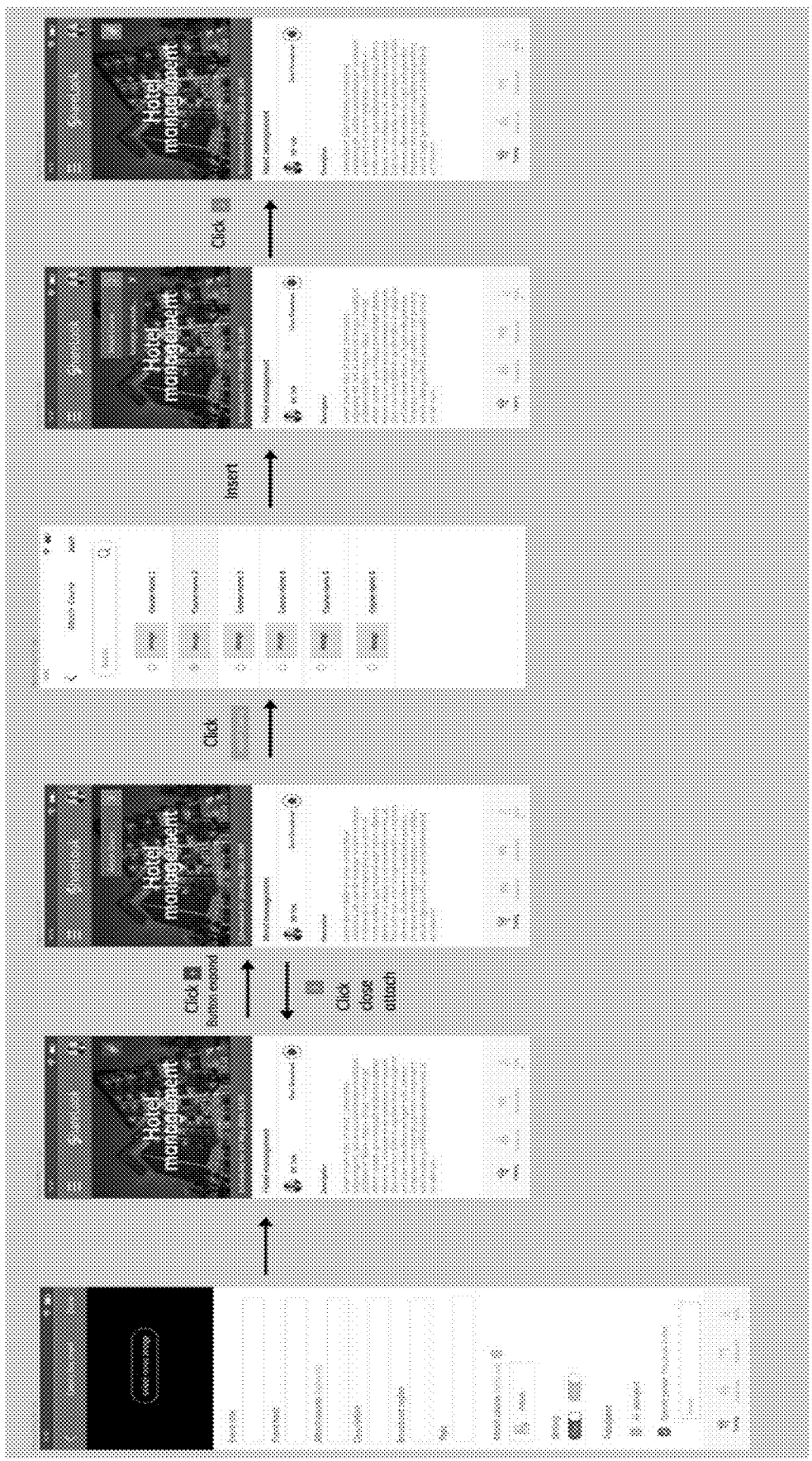
FIGS. 11a-11d show exemplary views of generating another live event content for a viewer.
Figure 11B:
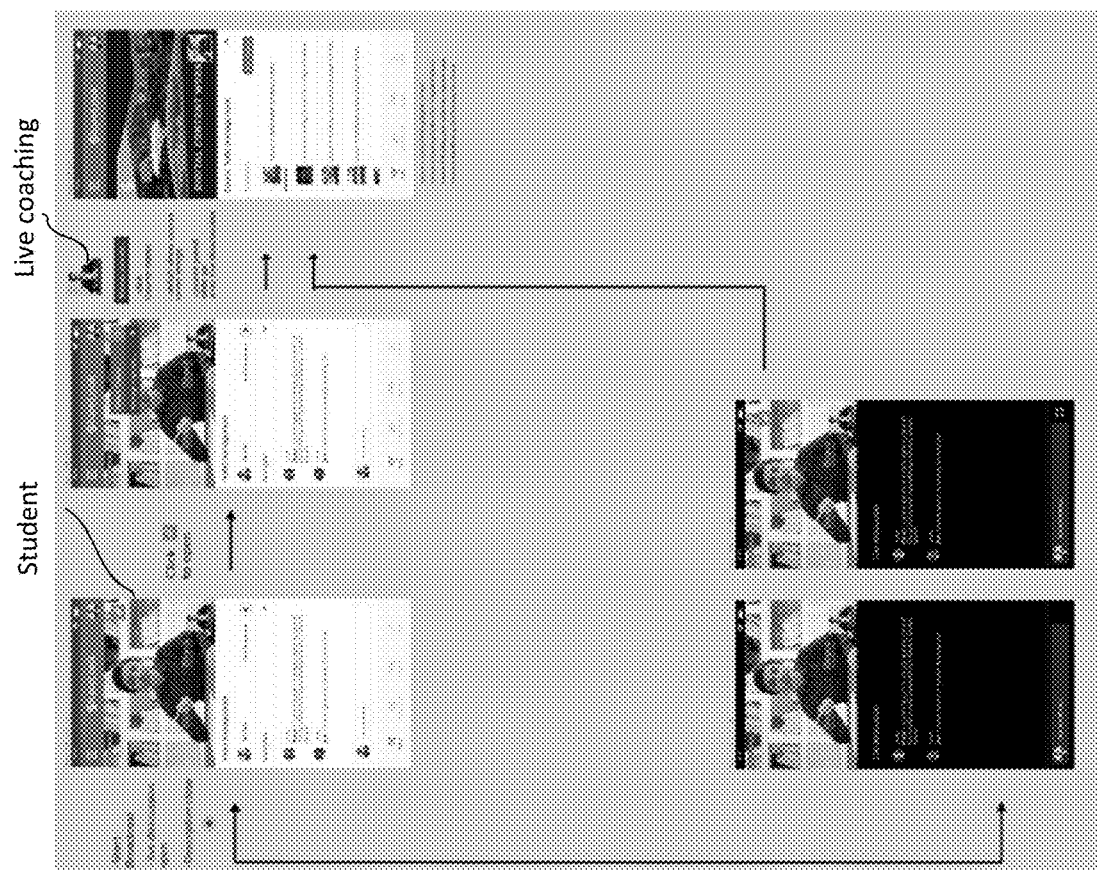
Figure 11C:
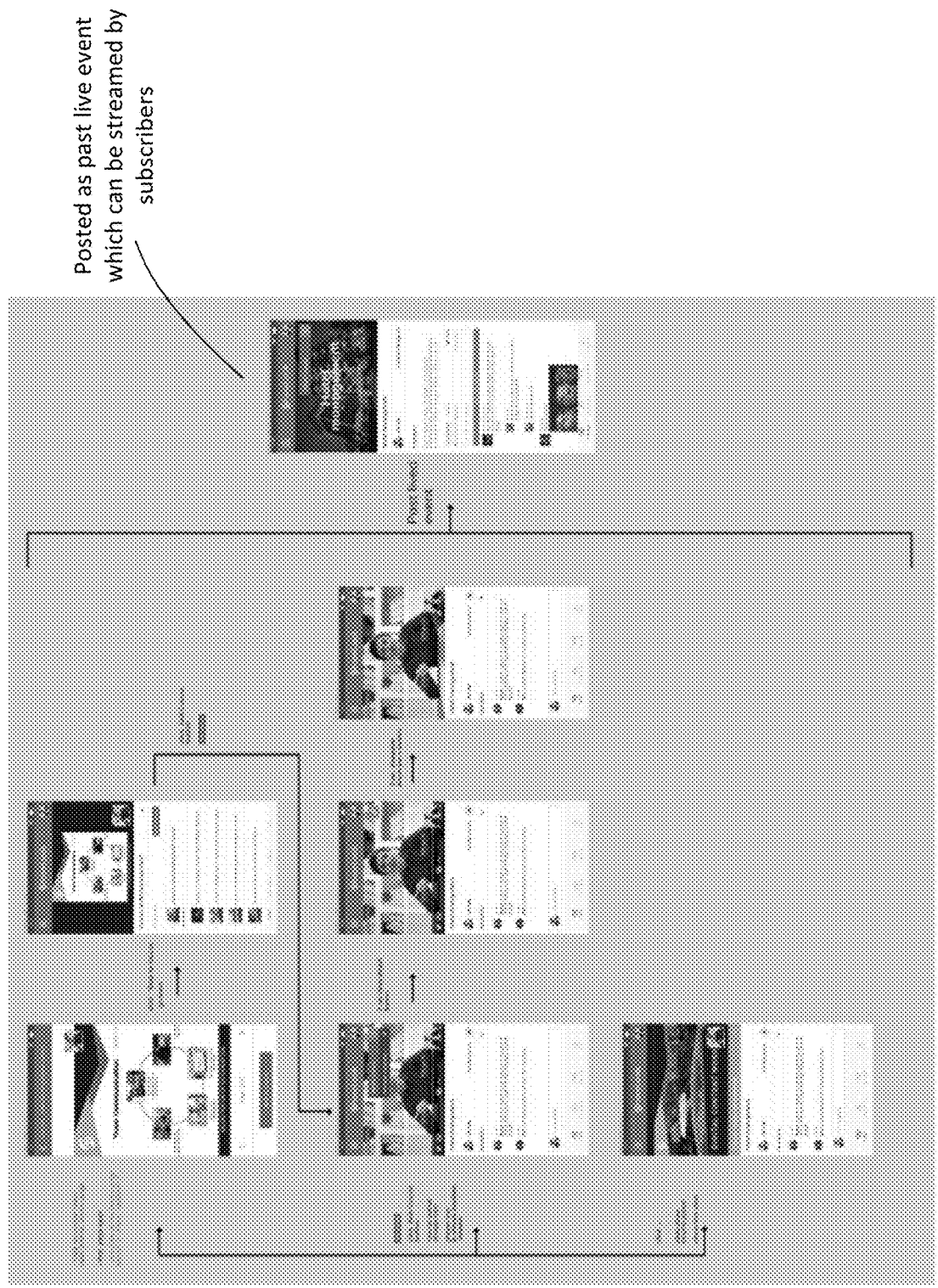
Figure 11D:
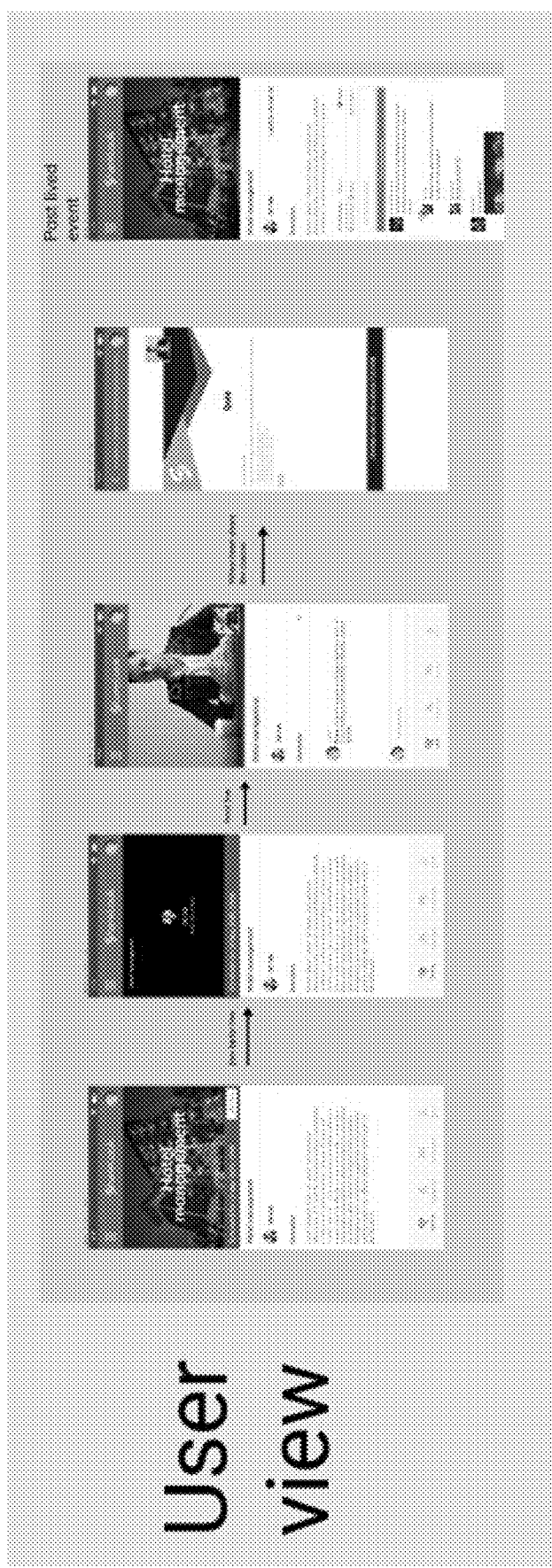
Figure 12A:
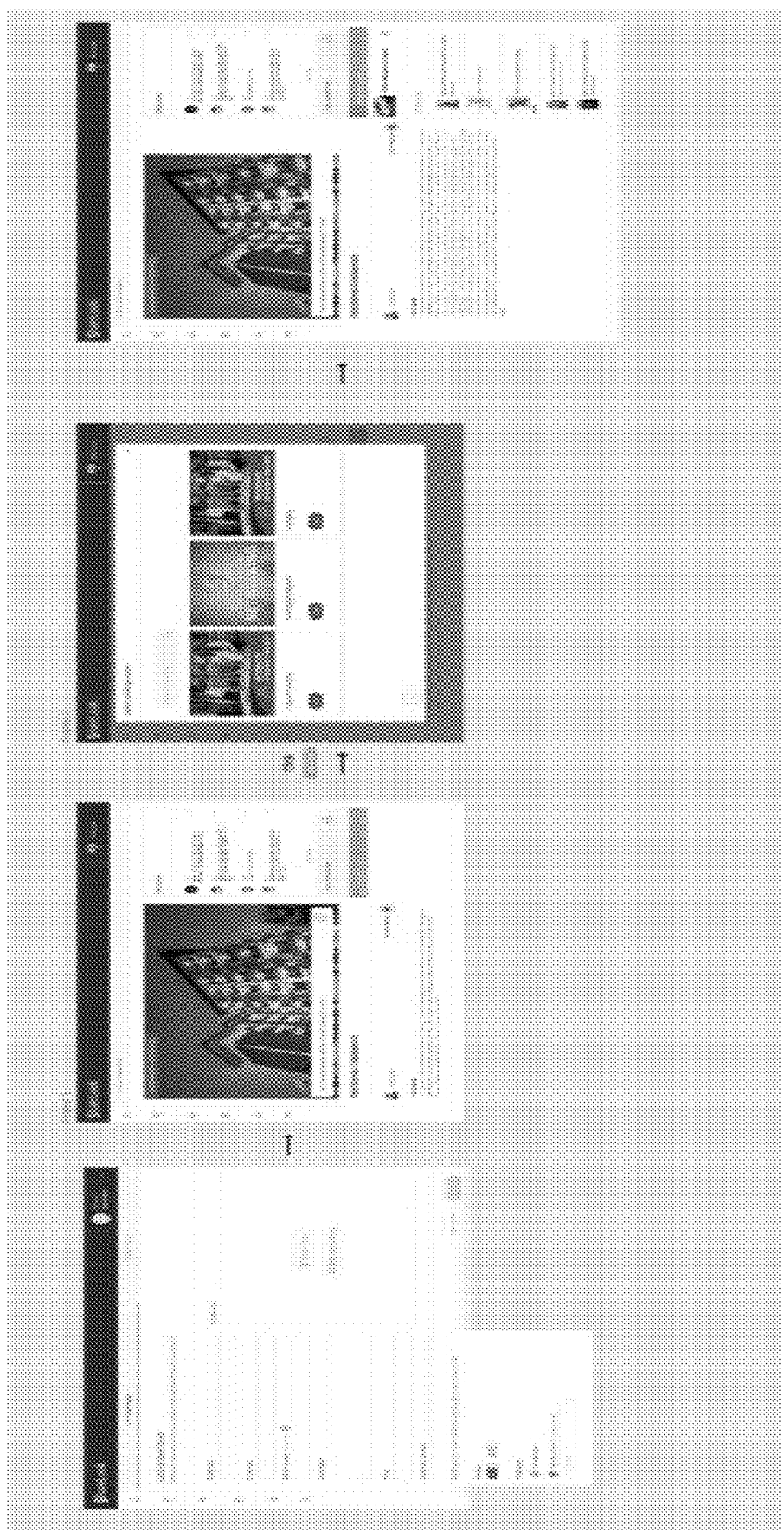
FIGS. 12a-12c show exemplary views of generating another live event content.
Figure 12B:
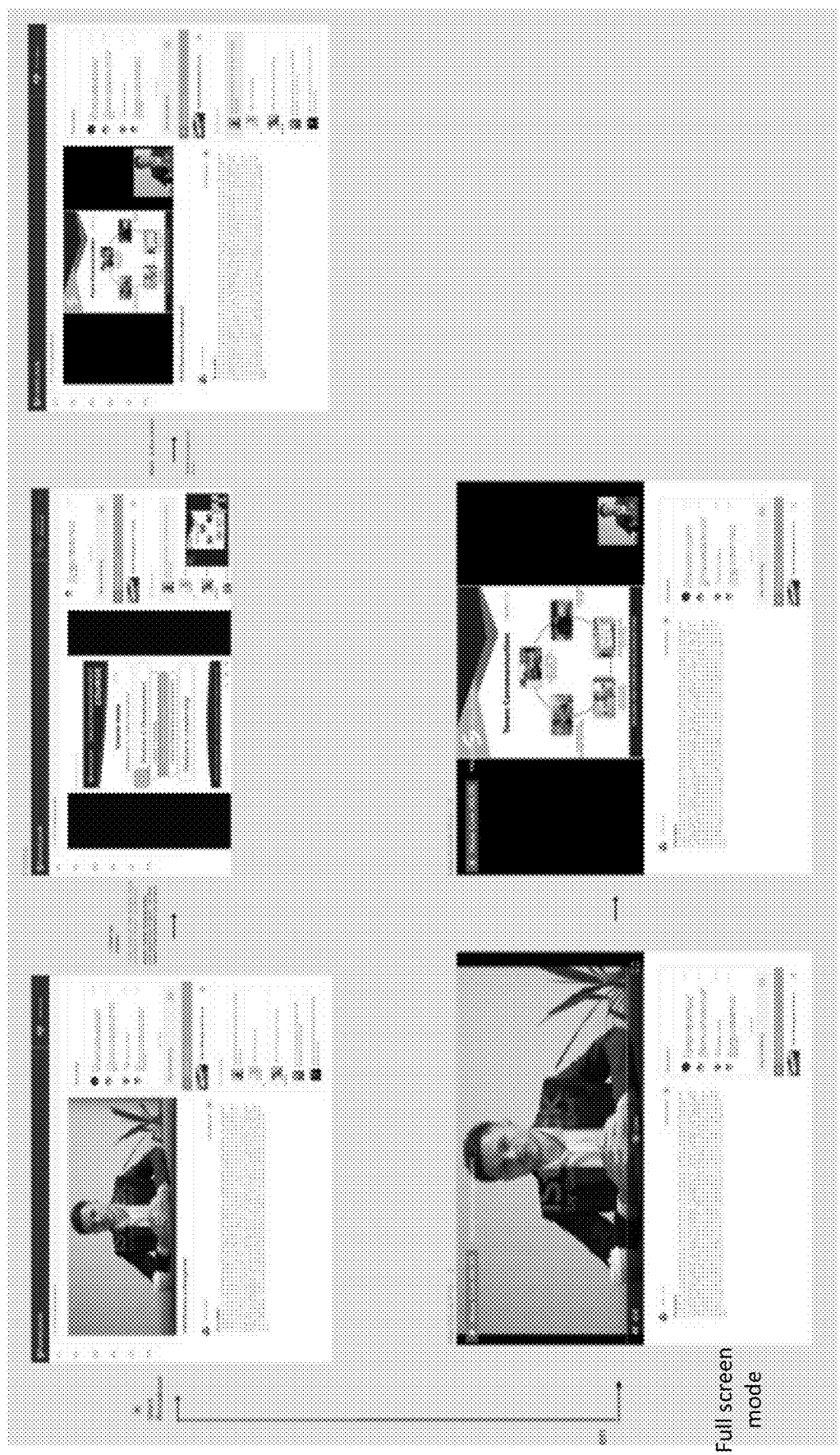
Figure 12C:
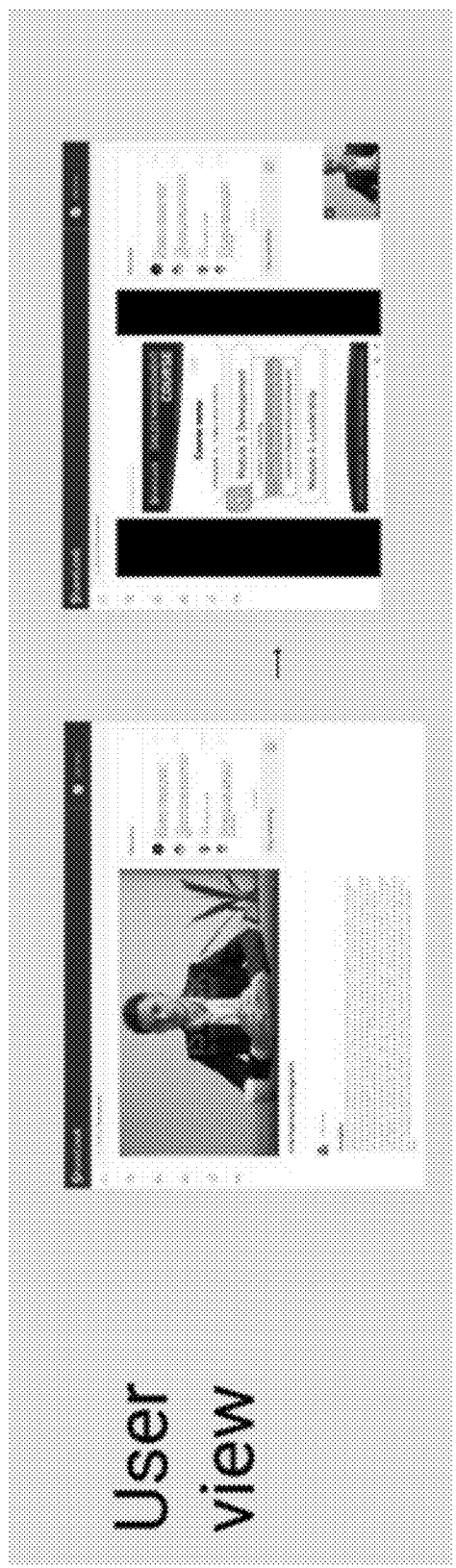

FIGS. 9a-9b show a process flow of generating live event content for a new course. FIGS. 10a-10d show exemplary views of generating live event content for multiple viewers while FIGS. 11a-11d show exemplary views of generating another live event content for a viewer. FIGS. 12a-12c show exemplary views of generating another live event content.

The inventive concept of the present disclosure may be embodied in other specific forms without departing from the spirit or essential characteristics thereof. The foregoing embodiments, therefore, are to be considered in all respects illustrative rather than limiting the invention described herein. Scope of the invention is thus indicated by the appended claims, rather than by the foregoing description, and all changes that come within the meaning and range of equivalency of the claims are intended to be embraced therein.

The invention claimed is:

1. A method for intelligent course building for an adaptive learning platform comprising:
providing a backend system, the backend system is configured to execute on a server and manage lessons for display on a user device, wherein the backend system includes
a content repository module, the content repository module containing existing contents, wherein the existing contents comprise learning objects which include live events comprising live broadcasts, conferences, webinars and coaching videos;
a content AI module, the content AI module is configured to split the existing contents into smaller content chunks of split contents according to topics using AI, wherein the split contents are topic specific while unsplit contents include multiple topics and are not topic specific, the split contents are stored in the content repository module;
a creation module for creating new courses, the creation module is configured to build new courses based on the split contents in the content repository module by employing AI processing techniques to search for relevant split contents stored in the content repository module;
providing a frontend system, the frontend system is configured to execute on the user device, wherein the frontend system includes a user interface for a user to access various modules of the backend system; and
generating a new course by a course builder user, wherein generating the new course comprises
submitting a course building query to the backend system using the frontend system by the course builder user,
processing the course building query by the backend system, wherein processing the course building query comprises
searching the content repository module and recommending the split contents from the content repository module according to topic of the course building query, and
displaying recommended split contents for the course builder user.

2. The method of claim 1 comprises:
selecting by the user from the recommended split contents selected split content for the new course; and
populating the selected split content into the new course.

3. The method of claim 1 comprises:
displaying to the course builder user by the creation module, which is assisted by AI, a selection of instructional design (ID) templates; and
selecting by the course builder a selected ID template from the selection of ID templates to use for the new course, wherein ID templates provide a logical structure for the new course.

4. The method of claim 1 comprises:
displaying a question box to the course builder by the creation module;
submitting a question in the question box by the course builder; and
displaying answers to the course builder in an answer box based on the question, wherein the answers comprise split contents which are relevant to the question (relevant split contents).

5. The method of claim 4 wherein displaying relevant split contents in the answer box is in order of relevance according to the question from the course builder.

6. The method of claim 4 comprises:
selecting by the user a selected ID template from ID templates for the new course; and
selecting selected relevant answers from the answer box to populate the selected ID template for the new course.

7. The method of claim 6 comprises editing the selected relevant answers by the course builder to populate the selected ID template for the new course.

8. The method of claim 1 includes generating the split contents by the content AI module comprising:
analyzing the existing contents to identify smaller chunks of existing contents according to topics;
splitting the existing contents into the smaller chunks of existing contents to produce the split contents according to topics; and
categorizing the split contents according to topics.

9. The method of claim 8 wherein splitting the existing contents comprises:
identifying changes from one topic to another topic (topic change) in the existing contents; and
splitting the existing contents into split contents at the topic changes in the existing contents.

10. The method of claim 2 comprises recommending the split contents to the course builder by a lesson layout AI module to complement the selected split content by the course builder.

11. An adaptive learning platform with an intelligent course builder comprising:
a backend system residing on a server, the backend system comprises
a content repository module, the content repository module containing existing contents, wherein the existing contents comprises learning objects which include live events comprising live broadcasts, conferences, webinars and coaching videos;
a content AI module, the content AI module is configured to split the existing contents into smaller content chunks of split contents according to topics using AI, wherein the split contents are topic specific while unsplit contents include multiple topics and are not topic specific, the split contents are stored in the content repository module;

a creation module, the creation module facilitates creating new courses by a course builder user, wherein a new course includes split contents from the content repository module which are determined to be relevant (relevant split contents); and a frontend system, the frontend system resides on a user device of the course builder, wherein the frontend system includes a user interface for the course user to access the backend system to build a new course.

12. The system of claim 11 wherein the creation module is configured to provide instructional design (ID) templates for the course builder user to select to use as a template for the new course.

13. The system of claim 11 wherein the content AI module comprises a content splitter, the content splitter is configured to:

identify changes in topics (topic changes) in the existing contents; and split the existing contents at the topic changes to form the split contents.

14. The system of claim 13 wherein the content AI module is configured to categorize the split contents based on topics.

15. The system of claim 11 wherein the creation module is configured to:

provide a question box for the course builder to enter a question; and provide relevant split contents based on the question for the course builder user to use to build the new course.

16. The system of claim 11 wherein the new course comprises relevant split contents selected by the course builder user.

17. The system of claim 16 comprises a lesson layout module having a recommendation unit, the recommendation unit is configured to recommend relevant split contents to the course builder to complement relevant split contents selected by the course builder.

* * * * *